United States Patent
Yamagata et al.

(10) Patent No.: US 6,835,461 B1
(45) Date of Patent: Dec. 28, 2004

(54) BIAXIALLY ORIENTED POLYESTER FILM, PROCESS FOR PRODUCING THE SAME, AND MAGNETIC RECORDING MEDIUM

(75) Inventors: Hikaru Yamagata, Mishima (JP); Masaaki Kotoura, Otsu (JP); Hirofumi Hosokawa, Kyoto (JP); Tetsuya Tsunekawa, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/719,875

(22) PCT Filed: Apr. 18, 2000

(86) PCT No.: PCT/JP00/02515

§ 371 (c)(1),
(2), (4) Date: Jan. 14, 2003

(87) PCT Pub. No.: WO00/63001

PCT Pub. Date: Oct. 26, 2000

(30) Foreign Application Priority Data

Apr. 19, 1999 (JP) ............................................. 11/110592
Oct. 7, 1999 (JP) ............................................. 11/286289

(51) Int. Cl.[7] ......................... B32B 27/36; B32B 31/16; B32B 31/30
(52) U.S. Cl. .................... 428/480; 428/473.5; 428/213; 428/694 ST; 428/694 SL; 428/910; 264/288.4; 264/290.2; 528/308; 528/308.1; 528/308.6; 525/165
(58) Field of Search ............................. 428/473.5, 480, 428/213, 694 ST, 694 SL, 910; 264/288.4, 290.2; 528/308, 308.1, 308.6; 525/165

(56) References Cited

U.S. PATENT DOCUMENTS

| | | | |
|---|---|---|---|
| 4,804,736 A | | 2/1989 | Utsumi |
| 4,985,537 A | * | 1/1991 | Utsumi et al. ............... 528/272 |
| 5,599,658 A | | 2/1997 | Greener et al. |
| 6,190,753 B1 | * | 2/2001 | Koseki et al. ............... 428/141 |
| 6,303,228 B1 | * | 10/2001 | Watanabe et al. ......... 428/423.7 |
| 6,306,496 B1 | * | 10/2001 | Endo et al. ................. 428/339 |
| 6,391,441 B1 | * | 5/2002 | Yano et al. ................. 428/343 |

FOREIGN PATENT DOCUMENTS

| | | | |
|---|---|---|---|
| JP | 1-206042 | | 8/1989 |
| JP | 1-312727 | | 12/1989 |
| JP | 63-170018 | | 7/1998 |
| JP | 2000-336183 A | * | 12/2000 |
| JP | 2002-370276 A | * | 12/2002 |

* cited by examiner

Primary Examiner—Vivian Chen
(74) Attorney, Agent, or Firm—Birch, Stewart, Kolasch & Birch, LLP

(57) ABSTRACT

The object of this invention is to provide a biaxially oriented polyester film suitable as a base film for high density magnetic recording media, small in track deviation and excellent in traveling durability and preservability, and to provide a production method thereof. The object of this invention can be achieved by a biaxially oriented polyester film, characterized in that the dimensional change rate (A) in the transverse direction of the film is in a range of −0.3 to 0% when the film is allowed to stand at 49° C. and 90% RH for 72 hours, while being loaded with 32 MPa in the machine direction.

15 Claims, No Drawings

BIAXIALLY ORIENTED POLYESTER FILM, PROCESS FOR PRODUCING THE SAME, AND MAGNETIC RECORDING MEDIUM

This application is the national phase under 35 U.S.C. § 371 of PCT International Application No. PCT/JP00/02515 which has an International filing date of Apr. 18, 2000, which designated the United States of America.

TECHNICAL FIELD

This invention relates to a biaxially oriented polyester film and a production method thereof. Particularly it relates to a biaxially oriented polyester film suitable as a base film for high density magnetic recording media and a production method thereof.

BACKGROUND ART

Biaxially oriented polyester films are used for various applications in view of their excellent thermal properties, dimensional stability and mechanical properties, and their usefulness as base films, for example, for magnetic tapes is well known. In recent years, base films for magnetic tapes are required to be further thinner and to allow higher density recording, for allowing apparatuses to be reduced in weight and size and for allowing recording for longer periods of time. However, a thinner film is insufficient in mechanical strength and less firm as a film or is likely to be elongated. Therefore, for example, if it is used for a magnetic tape, the recording track is likely to deviate, and the head touch may be worsened to lower the electromagnetic conversion properties disadvantageously. Therefore, there are more intensive demands for improving such properties as the tape elongation deformation caused by tension, the dimensional stability in tape use environment, traveling durability and preservability.

As base films to respond to the above demands, aramid films have been used in view of strength and dimensional stability. Aramid films are expensive and disadvantageous in view of cost, but they are used since there is not substitute for them.

On the other hand, higher strength polyester films (e.g., films of JP, 42-9270, B, JP, 43-3040, B, JP, 46-1119, B, JP, 46-1120, B, JP, 50-133276, A, U.S. Pat. No. 4,226,826, etc.) obtained with the prior art have many problems to be solved such that (1) the tape is cut during use, (2) edge damage occurs due to insufficient rigidity in the transverse direction, (3) the recording track deviates to cause errors during recording and reproduction and (4) because of insufficient strength, a thin film cannot be formed and desired electromagnetic conversion properties cannot be obtained. For application as a tape for large capacity high density recording, especially the problem of (3) is most important.

DISCLOSURE OF THE INVENTION

This invention has been achieved as a result of examining to solve the above problems of the prior art.

The object of this invention is to provide a biaxially oriented polyester film suitable as a base film for high density recording media, small in track deviation and excellent in traveling durability and preservability, and also to provide a production method thereof.

The inventors studied intensively to solve the above problems, and as a result, found that if the dimensional change rate of a biaxially oriented polyester film in the transverse direction under the tension, temperature and humidity conditions assuming a tape use environment is kept in a specific range, the magnetic tape obtained by using the biaxially oriented polyester film can be decreased in recording tack deviation and improved in traveling durability and preservability. Thus, this invention has been completed.

The object of this invention can be achieved by the following constitution.

(1) A biaxially oriented polyester film, characterized in that the dimensional change rate (A) in the transverse direction of the film is in a range of −0.3 to 0% when the film is allowed to stand at 49° C. and 90% RH for 72 hours, while being loaded with 32 MPa in the machine direction.

(2) A biaxially oriented polyester film, according to (1), wherein the ratio of the dimensional change rate (A) in the transverse direction under the conditions of (1) to the dimensional change rate (B) in the machine direction respectively in absolute value ($|A|/|B|$) is in a range of 0.1 to 1.0.

(3) A biaxially oriented polyester film, according to (1), wherein the heat shrinkage in the transverse direction at 100° C. is in a range of 0 to 0.5%.

(4) A biaxially oriented polyester film, according to (1), wherein the sum of the elastic modulus in the machine direction and that in the transverse direction is in a range of 9 to 30 GPa.

(5) A biaxially oriented polyester film, according to (1), wherein the thickness variation in the machine direction is 5% or less.

(6) A biaxially oriented polyester film, according to (1), which contains a polyether imide.

(7) A biaxially oriented polyester film, according to (6), wherein the content of the polyether imide is 5 to 30 wt %.

(8) A biaxially oriented polyester film, according to (7), which has a single glass transition temperature.

(9) A biaxially oriented polyester film, according to (1), wherein the polyester is polyethylene terephthalate, polyethylene-2,6-napthalene dicarboxylate or a copolymer thereof or a modification product thereof.

(10) A biaxially oriented polyester film, according to (1), wherein the halfwidth in the circumferential direction of the diffraction peak of the crystal face in the principle direction of the polyester, obtained when the polyester film is revolved around its normal, in the crystal orientation analysis by wide angle X-ray diffractometry, is in a range of 55 to 85 degrees.

(11) A method for producing a biaxially oriented polyester film, in which a cast film is stretched in the machine direction and in the transverse direction, stretched again in the machine direction and/or in the transverse direction, and heatset-treated and relaxation-treated, characterized by executing the relaxation treatment in two or more stages at a total relaxation rate of 5 to 10%.

(12) A method for producing a biaxially oriented polyester film, comprising the steps of stretching a cast film in the machine direction and in the transverse direction, stretching at a small ratio of 1.01 to 1.3 times in the transverse direction at a temperature in a range of glass transition temperature (Tg) to Tg+50° C., and stretching again in the machine direction and/or in the transverse direction.

(13) A method for producing a biaxially oriented polyester film, in which a cast film is stretched in the machine direction and in the transverse direction, stretched at a small ratio of 1.01 to 1.3 times in the transverse direction at a temperature in a range of glass transition temperature (Tg) to Tg+50° C., stretched again in the machine direction and/or in the transverse direction, and heatset-treated and relaxation-treated, characterized by executing the relaxation treatment in two or more stages at a total relaxation rate of 5 to 10%.

(14) A method for producing a biaxially oriented polyester film, according to any one of (11) through (13), wherein when the cast film is stretched in the machine direction and in the transverse direction, it is stretched in two or more stages in the machine direction and/or in the transverse direction.

(15) A magnetic recording medium, using the biaxially oriented polyester film as set forth in any one of (1) through (10).

THE BEST MODES FOR CARRYING OUT THE INVENTION

This invention is described below in detail.

The polyester used in this invention is a polyester mainly composed of an aromatic dicarboxylic acid, alicyclic dicarboxylic acid or aliphatic dicarboxylic acid and a diol.

The aromatic dicarboxylic acids that can be used here include, for example, terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenyletherdicarboxylic acid and 4,4'-diphenylsulfonedicarboxylic acid. Among them, terephthalic acid, phthalic acid and 2,6-napthalenedicarboxylic acid can be preferably used. As the alicyclic dicarboxylic acid, for example, cyclohexanedicarboxylic acid can be used. The aliphatic dicarboxylic acids that can be used here include, for example, adipic acid, suberic acid, sebacic acid and dodecanedionic acid. One of these acids can be used, or two or more of them can also be used in combination. Furthermore, a hydroxy acid such as hydroxyethoxybenzoic acid can also be partially copolymerized.

The diols that can be used here include, for example, ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, and polyalkylene glycol, 2,2'-bis (4'-β-hydroxyethoxyphenyl)propane. Among them, preferable are ethylene glycol, 1,4-butanediol, 1,4-cyclohexanedimethanol and diethylene glycol. Especially preferable is ethylene glycol. One of these diols can be used, or two or more of them can also be used in combination.

The polyester may also be copolymerized with another compound such as trimellitic acid, pyromellitic acid, glycerol, pentaerythritol, 2,4-dihydroxybenzoic acid, lauryl alcohol or phenyl isocyanate, as far as the polymer is substantially linear. As the polyester of this invention, polyethylene terephthalate (hereinafter abbreviated as PET), polyethylene-2,6-naphthalenedicarboxylate (hereinafter abbreviated as PEN) or a copolymer thereof or a modification product thereof is especially preferable.

It is preferable that the inherent viscosity of the polyester used in this invention is 0.55 to 2.0 dl/g, in view of dimensional stability of film, film forming stability and easiness to knead with a polyether imide (hereinafter abbreviated as PEI). A more preferable range is 0.58 to 1.40 dl/g, and a further more preferable range is 0.60 to 0.85 dl/g.

It is preferable that the biaxially oriented polyester film of this invention contains inactive particles. The inactive particles can be, for example, inorganic particles such as clay, mica, titanium oxide, calcium carbonate, kaolin, talc, wet or dry silica, colloidal silica, potassium phosphate, barium sulfate, aluminum silicate, alumina or zirconia, organic particles composed of acrylic acid or styrene, or internal particles precipitated, for example, by the catalyst added for polyester polymerization reaction. Among them, crosslinked polymer particles, alumina, spherical silica and aluminum silicate are especially preferable.

The biaxially oriented polyester film of this invention can contain other additives such as thermostabilizer, antioxidant, ultraviolet light absorber, antistatic agent, flame retarder, pigment, dye, fatty acid ester and organic lubricant such as wax, as far as this invention is not impaired.

It is preferable that the average particle size of the inactive particles contained in the biaxially oriented polyester film of this invention is 0.001 to 2 μm. A more preferable range is 0.005 to 1 μm, and a further more preferable range is 0.01 to 0.5 μm. If smaller than 0.001 μm, they do not act as surface projections of the film, and if larger than 2 μm, they are likely to come off as coarse projections unpreferably.

It is preferable that the content of the inactive particles contained in the biaxially oriented polyester film of this invention is 0.01 to 3 wt %. A more preferable range is 0.02 to 1 wt %, and a further more preferable range is 0.05 to 0.5 wt %. If smaller than 0.01 wt %, they are not effective, for example, for the film traveling property unpreferably, and if larger than 3 wt %, they cohere to form coarse projects that are likely to come off unpreferably.

The biaxially oriented polyester film of this invention can be of one layer or a laminate structure having two or more layers. In this invention, a two-layer structure in which a thin layer used for improving the traveling property and handling property of the film is laminated on one side of a substrate is especially preferable. In this case, the substrate refers to the layer with the largest thickness, and the other layers are called the laminated portion in this specification. Physical properties such as elastic modulus and dimensional stability said to be important for application to magnetic materials are mainly decided by the physical properties of the substrate.

It is preferable that the laminated portion of this invention satisfies a relation of $0.2\,d \leq t \leq 10\,d$, where d is the average particle size of the inactive particles (nm) and t is the thickness of the laminated portion (nm), since projections with uniform height can be obtained.

The polyester film of this invention has a feature that the dimensional change rate (A) in the transverse direction when the film is allowed to stand at 49° C. and 90% RH for 72 hours, while being loaded with 32 MPa in the machine direction is in a range of −0.3 to 0%. In this case, the minus means shrinking. A preferable range is −0.25 to 0%, and a further more preferable range is −0.2 to 0%.

In recent magnetic tapes for data recording, especially the track deviation due to the dimensional change in the transverse direction under the tape use environment is a problem. In the tape use environment, for example, the frictional heat with the magnetic head raises the temperature. The conventional polyester films are smaller than −0.3% in dimensional change rate (A), and if the dimensional change rate (A) is smaller than −0.3%, shrinking in the transverse direction occurs, to cause track deviation. Furthermore, in use as a magnetic tape, the traveling durability becomes poor and dropouts occur frequently to worsen the data preservability. If the dimensional change rate (A) becomes larger than 0%, wrinkling occurs when the film is processed into a tape.

In the polyester film of this invention, it is preferable that the ratio (|A|/|B|) in absolute value of the dimensional change rate (A) in the transverse direction under the above conditions to the dimensional change rate (B) in the machine direction is 0.1 or more in view of inhibition of tape elongation deformation caused by tension and traveling durability. It is preferable that the ratio is 1.0 or less, in view of data preservability such as the inhibition of dropouts. A more preferable range is 0.2 to 0.9, and a further more preferable range is 0.3 to 0.8.

In the polyester film of this invention, it is preferable that 100° C. heat shrinkage in the transverse direction is 0% or more, in view of inhibition of wrinkling during tape processing. It is preferable that the ratio is 0.5% or less in view of data preservability. A more preferable range is 0 to 0.4%, and a further more preferable range is 0 to 0.3%.

In the biaxially oriented polyester film of this invention, in view of traveling durability, preservability and inhibition of track deviation, it is preferable that the sum of elastic modulus in the machine direction and that in the transverse direction is 9 GPa or more. In view of inhibition of tape breaking, it is preferable that the sum is 30 GPa or less. A more preferable range is 10 to 27 GPa, and a further more preferable range is 11 to 24 GPa. It is also preferable that the elastic modulus in the transverse direction is 4.5 GPa or more, in view of the inhibition of shrinking in the transverse direction caused by the tension in the machine direction. In view of not inhibiting the strength in the machine direction, it is preferable that the elastic modulus is 13 GPa or less. A more preferable range is 5 to 12 GPa.

In recent applications, the polyester is especially required to be highly uniform in thickness in response to hardware with higher performance. In view of smaller variation of physical properties, it is preferable that the thickness variation, i.e., the difference between the thick portion and the thin portion of the polyester film in the machine direction of the film is 5% or less. More preferable is 4% or less, and further more preferable is 2% or less. For example for application to magnetic materials, smaller thickness variation in the machine direction is preferable also in view of higher traveling durability, inhibition of partial elongation, and prevention of troubles such as swaying or disordered winding in secondary processing such as film coating or certain width slitting.

It is preferable that the biaxially oriented polyester film of this invention contains a PEI, since the glass transition temperature of the film rises and since the dimensional stability at high temperatures improves. Especially it is preferable that the PEI content of the biaxially oriented polyester film is in a range of 5 to 30 wt %, since it is easy to keep the dimensional change rate in the transverse direction in the range of this invention. A more preferable range is 10 to 25 wt %. If the PEI content is in the above range, the strength achieved with stretching becomes high preferably. Especially when the PEI content is 30 wt % or less, the film crystallinity becomes large preferably.

It is preferable that the biaxially oriented polyester film containing PEI has a single glass transition temperature (Tg). Whether or not the film has a single Tg is adequately judged using various analysis methods such as differential scanning calorimetry analysis and dynamic viscoelasticity measurement. If it is difficult to judge in reference to methods of referring only to the solid state properties, a morphological method such as microscopic observation can also be used together. When the Tg is judged by differential scanning calorimetry analysis, it is effective to use the temperature modulation method and the high sensitivity method. In this invention, the glass transition temperature of 5 mJ/g/° C. or less in the reversible specific heat change detected with differential scanning calorimetry analysis is disregarded. In this judgment, if the film has a single Tg, the film stretchability improves greatly, and the film breaking frequency declines, while uniform stretchability greatly improves, allowing a high quality film to be easily obtained. In view of dimensional stability at high temperatures, it is preferable that the single Tg is 110° C. or higher. In view of film forming stability, it is preferable that the Tg is 140° C. or lower. A more preferable Tg range is 113 to 137° C., and a further more preferable range is 116 to 134° C.

The PEI used in this invention is a polymer containing an aliphatic, alicyclic or aromatic ether unit and a cyclic imide group as recurring units, and is not especially limited as far as it is a melt moldable polymer. For example, a polymer described in U.S. Pat. No. 4,141,927 can be used. Unless the effect of this invention is impaired, the main chain of the PEI can contain any other structural unit than the cyclic imide and ether unit, such as an aromatic, aliphatic or alicyclic ester unit or oxycarbonyl unit.

Particularly, as the PEI, the polymers represented by the following general formula can be enumerated.

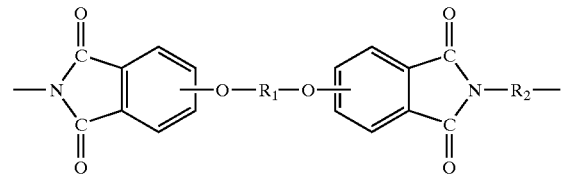

(where $R_1$ denotes a divalent aromatic or aliphatic residue having 6 to 30 carbon atoms, and $R_2$ denotes a divalent organic group selected from a group consisting of divalent aromatic residue having 6 to 30 carbon atoms, alkylene group having 2 to 20 carbon atoms, cycloalkylene group having 2 to 20 carbon atoms and polydiorganosiloxane group chain-terminated by an alkylene group having 2 to 8 carbon atoms.)

As the above $R_1$ and $R_2$, for example, the aromatic residues represented by the following formulae can be enumerated.

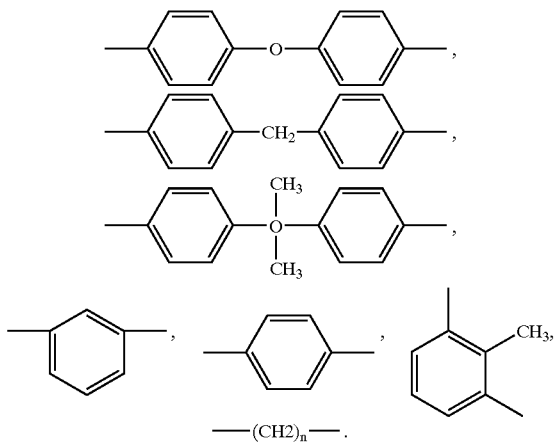

In this invention, in view of compatibility with the polyester, cost, and melt moldability, a PEI having a glass transition temperature of 350° C. or lower is preferable. More preferable is 250° C. or lower. A condensation product between 2,2-bis[4-(2,3-dicarboxyphenolxy)phenyl]propane dianhydride and m-phenylenediamine or p-phenylenediamine having a structural unit represented by the following formula is preferable. The PEI is available with a trade name of "Ultem" (registered trade mark) from General Electric.

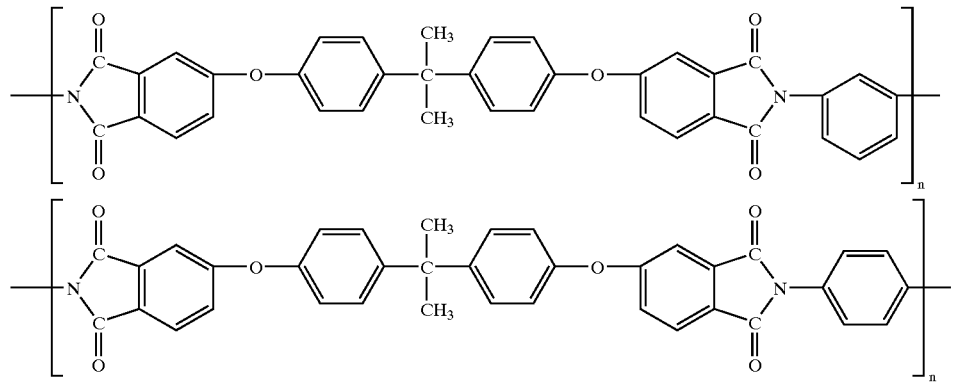

In the polyester film of this invention, it is preferable that the halfwidth in the circumferential direction of the diffraction peak of the crystal face in the principle direction of the polyester, obtained when the polyester film is revolved around its normal, in the crystal orientation analysis by wide angle X-ray diffractometry, is in a range of 55 to 85 degrees. The halfwidth in the circumferential direction of the diffraction peak of the crystal face in the principle direction of the polyester expresses the spread of the distribution of crystal orientation of the polyester film. In view of preventing the tape breaking caused when the propagating tear strength of the film becomes small, it is preferable that the halfwidth is 55 degrees or more, and in view of obtaining a film with high strength in all the orientations in the face of the film, it is preferable that the halfwidth is 85 degrees or less. The crystal face in the principle direction of the polyester in this case refers to the crystal face with its normal closest to the principle direction of the polyester, among the crystal faces detected as diffraction peaks by wide angle X-ray diffractometry, and refers to the (−105) face with PET. A more preferable halfwidth range is 60 to 83 degrees, and a further more preferable range is 65 to 80 degrees.

In the polyester film of this invention, it is preferable that the refractive index ($n_{ED}$) in the normal direction of the film is in a range of 1.47 to 1.485, and that the planar orientation index (fn) is in a range of 0.175 to 0.195. If the refractive index ($n_{ZD}$) in the normal direction of this invention is more than 1.485 and the face orientation index (fn) is less than 0.175, then the elongation deformation caused by the stress acting on the magnetic tape during tape traveling is likely to occur, and track deviation is likely to occur. Furthermore, if the refractive index ($n_{ZD}$) in the normal direction is less than 1.47 and the planar orientation index (fn) is more than 0.195, care must be exercised since the propagating tear strength of the film becomes small, making tape breaking likely to occur. It is more preferable that the refractive index ($n_{ZD}$) in the normal direction of the film of this invention is in a range of 1.473 to 1.482, and that the planar orientation index (fn) is in a range of 0.18 to 0.193.

It is preferable that the density of the polyester film of this invention is 1.39 g/cm$^3$ or more, in view of sufficient structural fixing and tape preservability. In view of maintaining the propagating tear strength of the film and inhibiting tape breaking, it is preferable that the density is 1.405 g/cm$^3$ or less.

In the polyester film of this invention, it is preferable that the temperature expansion coefficient (α) is in a range of −5×10$^{-6}$ to 15×10$^{-6}$ (/° C.) in view of dimensional stability under temperature and humidity conditions. In this case, the minus indicates shrinking. A more preferable range is −4×10$^{-6}$ to 13×10$^{-6}$ (/° C.), and a further more preferable range is −3×10$^{-6}$ to 11×10$^{-6}$ (/° C.).

Furthermore, like the temperature expansion coefficient, it is preferable that the humidity expansion coefficient (β) is in a range of −2×10$^{-6}$ to 15×10$^{-6}$ (/% RH) in view of dimensional stability under temperature and humidity conditions. A more preferable range is −1×10$^{-6}$ to 13×10$^{-6}$ (/% RH), and a further more preferable range is 1×10$^{-6}$ to 10×10$^{-6}$ (/% RH).

In the biaxially oriented polyester film of this invention, it is preferable that the surface roughness $Ra_A$ of the film surface on one side (surface A) is 3 nm or more in view of reducing the friction with the magnetic head, and it is preferable that the surface roughness is 10 nm or less in view of electromagnetic conversion properties. Furthermore, it is preferable that the surface roughness $Ra_B$ of the film surface on the other side (surface B) is 5 nm or more in view of handling property during processing. It is preferable that the surface roughness is 17 nm or less in view of reducing the transfer caused by the pressure acting when the tape is wound. A more preferable $Ra_A$ range is 3 to 9 nm, and a preferable $Ra_B$ range is 6 to 16 nm. A more preferable $Ra_A$ range is 4 to 8 nm, and a more preferable $Ra_B$ range is 7 to 15 nm.

In the biaxially oriented polyester film of this invention, it is preferable that the creep compliance after lapse of 30 minutes at 50° C. with a load of 28 MPa is in a range of 0.11 to 0.45 GPa$^{-1}$. It is preferable that the creep compliance of this invention is 0.45 GPa$^{-1}$ or less, in view of inhibiting the elongation deformation of the tape caused by the tension during tape traveling or preservation and inhibiting the track deviation during recording and reproduction. Furthermore, it is preferable that the creep compliance is 0.11 GPa$^{-1}$ or more in view of inhibiting tape breaking. A more preferable creep compliance range is 0.13 to 0.37 GPa$^{-1}$, and the most preferable range is 0.15 to 0.30 GPa$^{-1}$. In this case, creep refers to a phenomenon that the strain increases with the lapse of time under a certain stress, and the creep compliance refers to the ratio of the strain to the certain stress.

The track deviation in the transverse direction of the ½' wide magnetic tape obtained by processing the biaxially oriented polyester film of this invention and measured under the conditions described later is in a range of 0 to 1 μm, in view of wound tape style and inhibition of dropouts. Furthermore, it is preferable that the maximum dimensional change width of the magnetic tape is in a range of 0 to 3 μm in view of tape traveling durability and data preservability. A more preferable track deviation range is 0 to 0.8 µm, and the most preferable range is 0 to 0.5 µm. A more preferable maximum dimensional change width range is 0 to 2 µm, and the most preferable range is 0 to 1.5 µm.

The biaxially oriented polyester film of this invention can be preferably used for magnetic recording tapes, capacitors, heat transfer ribbons, heat sensitive mimeographic paper, etc. An especially preferable application is a high density magnetic recording medium for data storage requiring a uniform and fine surface pattern. A preferable data recording-capacity is 30 GB (gigabytes) or more. More preferable is 70 GB or more, and further more preferable is 100 GB or more. It is preferable that the thickness of the base film for the high density magnetic recording medium is 3 to 7 µm. A more preferable range is 3.5 to 6.5 µm, and a further more preferable range is 4 to 6 µm.

As the magnetic layer for the magnetic tape, for example, a thin ferromagnetic metallic film or a magnetic film having a fine ferromagnetic metallic powder dispersed in a binder, and a magnetic layer coated with a metal oxide can be enumerated. As the thin ferromagnetic metallic film, iron, cobalt, nickel or any other alloy is preferable. As the fine ferromagnetic metallic powder, a fine ferromagnetic hexagonal ferrite powder, iron, cobalt, nickel or other alloy is preferable. As the binder, a thermoplastic resin, thermosetting resin, reactive resin or any of mixtures thereof is preferable.

For forming the magnetic layer, either coating method or dry method can be adopted. In the coating method, a magnetic powder is kneaded with a binder such as a thermoplastic resin, thermosetting resin or ultraviolet curing resin, and the mixture is applied and dried. In the dry method, a thin magnetic metallic film is directly formed on a substrate film by vapor deposition, sputtering or ion plating, etc.

In the magnetic recording medium of this invention, a protective film may be formed on the thin ferromagnetic metallic film, since the protective film can further improve traveling durability and corrosion resistance. The protective film that can be used here include an oxide protective film formed by silica, alumina, titania, zirconia, cobalt oxide or nickel oxide, etc., a nitride protective film formed by titanium nitride, silicon nitride or boron nitride, etc., a carbide protective film formed by silicon carbide, chromium carbide or boron carbide, etc., or a carbon protective film formed by carbon such as graphite or amorphous carbon, etc.

The carbon protective film is a carbon film formed by amorphous structure, graphite structure, diamond structure or any of mixtures thereof prepared by plasma CVD or sputtering, etc. A hard carbon film generally called diamond-like carbon is especially preferable.

Furthermore, for the purpose of further improving the adhesion to the lubricant given on the hard carbon protective film, the surface of the hard carbon film may be treated by an oxidative or inactive gas plasma.

In this invention, to improve the traveling durability and corrosion resistance of the magnetic recording medium, it is preferable to add a lubricant and rust preventive onto the magnetic film or protective film.

The polyester film of this invention is a film obtained by highly stretching and orienting a cast film produced by melt-molding a polyester resin, by sequential biaxial stretching and/or simultaneous biaxial stretching, in the machine direction and the transverse direction. The following two methods are preferable methods for producing the polyester film of this invention.

1. A cast film is stretched in the machine direction and in the transverse direction, stretched again in the machine direction and/or in the transverse direction, and heatset-treated and relaxation-treated. The relaxation treatment is executed in two or more stages at a total relaxation rate of 5 to 10%.

The polyester film is heatset-treated as described above, uniformly gradually cooled under relaxation, then cooled to room temperature, and wound. It is preferable that the heatset treatment temperature is 190 to 220° C. A more preferable range is 205 to 220° C. The heatset treatment is to heat-treat a stretched film at a temperature higher than the stretching temperature and lower than the melting point of the film, for crystallizing the film. The heatset treatment makes the film flat and thermally dimensionally stable. It is preferable that the heatset treatment is executed with the film width kept constant, but heatset treatment and relaxation treatment can also be executed simultaneously by heatset-treating the film with the film relaxed in the transverse direction.

Furthermore, it is preferable to cool the film at 40 to 180° C. with the film relaxed in the transverse direction.

By keeping the total relaxation rate in the transverse direction at 5% or more, the dimensional change rate in the transverse direction can be kept in the range of this invention. In view of inhibiting the wrinkling by expansion and the thickness variation, it is preferable that the total relaxation rate in the transverse direction is 10% or less. A more preferable range is 6 to 9%. As the temperatures of the relaxation treatment in said two or more stages, it is preferable that the temperature of the first stage is in a range of 120 to 180° C., and that the temperature in the second and later stages is in a range of 100 to 140° C. It is more preferable that the temperature in the first stage is in a range of 125 to 160° C., and that the temperature of the second and later stages is in a range of 110 to 130° C. As for the relaxation rates, it is preferable that the relaxation rate in the first stage is larger than the relaxation rate in the second and later stages. It is preferable that the relaxation rate in the first stage is in a range of 3 to 7%, and that the relaxation rate in the second and later stages is in a range of 1 to 4%. The relaxation treatment in these conditions can reduce the residual stress of the film, to further inhibit the dimensional change. The relaxation rates in the first stage and the second and later stages are the values in reference to the film width achieved after final stretching, and the total relaxation rate is the sum of the relaxation rate in the first stage and that in the second and later stages.

2. A cast film is stretched in the machine direction and in the transverse direction, stretched at a small ratio of 1.01 to −1.3 times in the transverse direction at a temperature in a range of the glass transition temperature (Tg) to. (Tg)+50° C., and stretched again in the machine direction and/or in the transverse direction. The stretching in the transverse direction at a small ratio makes the film likely to be oriented in the transverse direction in the later stretching, and allows the dimensional change rate in the transverse direction in the range of this invention. A preferable stretching temperature range is Tg+5 to Tg+45° C., and a more preferable range is TG+10 to Tg+40° C. A more preferable stretching ratio range is 1.05 to 1.25 times, and a more preferable range is 1.1 to 1.2 times.

It is more preferable that the heatset treatment and relaxation treatment are executed under the conditions of the above 1 after stretching under the conditions of the above 2, since the physical properties of the biaxially oriented polyester film of this invention are more likely to be obtained.

In the above method 1 or 2, when the cast film is stretched in the machine direction and in the transverse direction, it is preferable to stretch in two or more stages in the machine direction and/or in the transverse direction. It is preferable to stretch at a temperature (T1) in a range of Tg to Tg+60° C. and at a ratio of 1.2 to 3.0 times in the first stage, and to stretch at a temperature in a range of the first stage stretching temperature (T1)−10 to T1−50° C. and at a ratio of 1.2 to 4.0 times in the second and later stages. It is preferable that the stretching temperature in the second stage (T2) is kept lower than that in the first stage, since the orientation distributions in the machine direction and in the transverse direction of the film can be kept small.

Furthermore, the obtained film is trimmed at the edges and wound as a roll, and it is preferable to heat-treat the rolled fill in a heated hot air oven. It is preferable that the heat treatment temperature is in a range of Tg−10 to Tg−60° C. A more preferable range is Tg−15 to Tg−55° C., and a further more preferable range is Tg−20 to Tg−50° C. It is preferable that the heat treatment time is in a range of 24 to 360 hours. A more preferable range is 48 to 240 hours, and a further more preferable range is 72 to 168 hours.

A particular method for producing a PET film by sequential biaxial stretching is described below. However, this invention is not limited to or by the following description.

At first, according to a conventional method, terephthalic acid and ethylene glycol are esterified or dimethyl terephthalate and ethylene glycol are ester-interchanged, to obtain bis-β-hydroxyethyl terephthalate (BHT). The BHT is transferred into a polymerization reactor, and heated in vacuum at 280° C. for polymerization reaction, to obtain a polyester with an inherent viscosity of about 0.5. The obtained polyester is polymerized in solid phase under reduced pressure as pellets. For solid phase polymerization, preliminary crystallization is executed at a temperature lower than 180° C. beforehand, and solid phase polymerization is executed at 190 to 250° C. at a reduced pressure of about 1 mm Hg for 1.0 to 50 hours. For letting the polyester contains particles, it is preferable that a slurry having the particles dispersed in ethylene glycol at a predetermined rate beforehand is polymerized with terephthalic acid. When the particles are added, for example, if the water sol or alcohol sol obtained when the particles are synthesized is added without being dried once, the particles can be dispersed well. It is also effective to mix a water slurry of particles and polyester pellets, and to knead the mixture into a polyester using a vented double screw kneading extruder. As an effective method for adjusting the content and number of particles, a highly concentrated particle master is prepared according to the above method, and it is diluted with a polyester or any other plastic resin or a mixture thereof substantially not containing particles for adjusting the content of particles when the film is formed. Pellets of a polyester containing inactive particles at a high concentration are mixed with pellets of a polyester not substantially containing particles, and the mixture is dried at 180° C. for more than 3 hours in vacuum sufficiently, supplied into an extruder heated to a temperature of 270 to 370° C., molten, fed through a fiber stainless steel filter and extruded as a sheet from a T die. The molten sheet is electrostatically brought into contact with a drum cooled on the surface to a temperature of 10 to 40° C., to be cooled and solidified, for obtaining a substantially non-oriented cast polyester film.

The cast polyester film is stretched, heatset-treated and relaxation-treated under the conditions described in the following (1) or (2).

(1) The cast polyester film is passed over several heating rolls, to be sufficiently heated, and then stretched in the machine direction using the difference in peripheral speed of rolls. It is preferable that the stretching temperature is in a range of the glass transition temperature (Tg) of the polyester+30 to Tg+70° C. A more preferable range is Tg+35 to Tg+65° C. It is preferable that the stretching ratio is 3 to 7 times. A more preferable range is 3.5 to 6 times. In view of high ratio stretching, it is preferable that the stretching temperature is Tg+30° C. or higher, and in view of obtaining a high elastic film with molecules effectively oriented, a stretching temperature of Tg+70° C. or lower is preferable.

Then the obtained film stretched in the machine direction is stretched in the transverse direction. For stretching in the transverse direction, for example a stenter is used. It is preferable that the stretching temperature is in a range of Tg+10 to Tg+50° C. A more preferable range is Tg+15 to Tg+45° C. It is preferable that the stretching ratio is in a range of 3 to 7 times. A more preferable range is 3.5 to 6 times. As in the longitudinal stretching, also in the lateral stretching, in view of stretching at a high ratio, it is preferable that the stretching temperature is Tg+10° C. or higher, and in view of effective orientation of molecules, it is preferable that the stretching temperature is Tg+50° C. or lower.

Furthermore, the film is stretched in the transverse direction at a small ratio in the same stenter. It is preferable that the stretching temperature is in a range of Tg to Tg+50° C. A more preferable range is Tg+10 to Tg+40° C. It is preferable that stretching ratio is in a range of 1.01 to 1.3 times. A more preferable range is 1.05 to 1.25 times. The above stretching in said temperature range in said small stretching ratio can be executed also in two or more stages with stepwise heating. Then, furthermore, second longitudinal stretching and/or second lateral stretching can also be executed. It is preferable that the heatset temperature is in a range of 190 to 250° C. A more preferable range is 200 to 240° C. In the heatset step, stretching to at a ratio of 1 to 2 times can be executed in one or more zones.

Furthermore, it is preferable to cool the film in a temperature zone in a range of 40 to 180° C., while being relaxed in the transverse direction. In this case, it is preferable that the relaxation ratio is in a range of 3 to 7%. A more preferable range is 3.5 to 6.5%. In view of dimensional stability, it is preferable that the heatset temperature is 205° C. or higher and that the relaxation rate is 3% or higher. Then, the film is trimmed at the edges and wound as a roll.

(2) The cast polyester film is at first stretched in the machine direction. The polyester is passed over sufficiently heated several rolls, to be sufficiently heated, and then stretched in the machine direction using the difference in peripheral speed of rolls. It is preferable that the stretching temperature is in a range of Tg to Tg+60° C., and that the stretching ratio is in a range of 1.2 to 3 times. A more preferable stretching temperature range is Tg+15 to Tg+45° C., and a more preferable stretching ratio range is 1.5 to 2.5 times.

The obtained longitudinally stretched film is in succession stretched in the transverse direction. For stretching in the transverse direction, a stenter is used. It is preferable that the stretching temperature (T1) is in a range of Tg to Tg+60° C. as in the previous longitudinal stretching temperature, and that the stretching ratio is in a range of 1.2 to 3 times. A more preferable stretching temperature range is Tg+15 to Tg+45° C., and a more preferable stretching ratio range is 1.5 to 2.5 times.

It is preferable that the birefringence (Δn) of the biaxially oriented film obtained like this is in a range of 0 to 0.02. A more preferable range is 0 to 0.01. If the birefringence is in the above range, a film having mechanical strength balanced between the machine direction and the transverse direction and excellent in heat shrinkage can be obtained.

The biaxially oriented film obtained like this is again stretched in the transverse direction in the same stenter. It is preferable that the second stretching temperature (T2) is in a range of the previous lateral stretching temperature (T1)−10 to T1−50° C., and that the stretching ratio is in a range of 1.2 to 4 times, since the film can be stretched moderately to enhance the mechanical strength in the transverse direction and since the stretchability is good when second longitudinal stretching and third lateral stretching are executed after the second lateral stretching. A more preferable stretching temperature range is T1−20 to T1−40° C., and a more preferable stretching ratio range is 2 to 3 times. After the lateral stretching, as required, heatset treatment can also be executed. Furthermore, the film obtained as described above is stretched again in the machine direction. It is preferable that the stretching temperature (T3) is in a range of the second lateral stretching temperature (T2) to T2+60° C., and that the stretching ratio is in a range of 1.2 to 6 times, since a film suitably oriented in the machine direction and balanced between the machine direction and the transverse direction can be obtained. A more preferable stretching temperature range is the second lateral stretching temperature (T2)+5 to T2+55° C., and a more preferable stretching ratio range is 2 to 5 times. When the second longitudinal stretching is executed, it can be executed in one stage or two or more stages with a temperature gradient, if the stretching temperature and ratio are in the above ranges. Furthermore, in this invention, the second longitudinal stretching and the third lateral stretching can also be executed. In the third lateral stretching, it is preferable that the stretching temperature is in a range of the second longitudinal stretching temperature (T3) to the melting temperature (tm) of the polyester −20° C., and that the stretching ratio is 1.05 to 3 times.

The polyester film obtained like this is heatset-treated under relaxation, to have flatness and thermal dimensional stability, and uniformly gradually cooled, then cooled to room temperature, and wound. It is preferable that the heatset temperature is in a range of 190 to 220° C. A more preferable range is 205 to 220° C. Furthermore, it is preferable to cool the film in a temperature zone in a range of 40 to 180° C., while being relaxed in the transverse direction. In this invention, it is preferable that the relaxation rate is in a range of 5 to 10%. A more preferable range is 6 to 9%. In view of dimensional stability, it is preferable that the heatset temperature is 205° C. or higher, and that the relaxation rate is 5% or more. Then, the film is trimmed at the edges, and wound as a roll.

<Methods for Evaluating Physical Values>

(1) Dimensional Change Rates (A) and (B) (%)

Sample size: 100 mm in the machine direction and 30 mm in the transverse direction The above sample was conditioned at 23° C. and 65% RH without any load for 24 hours, and electrostatically stuck onto a chromium mask produced by Dai Nippon Printing Co., Ltd., and the length in the machine direction ($LO_L$) and the length in the transverse direction ($LO_W$) were measured using an optical microscope. Then, it was allowed to stand at 49° C. and 90% RH, while being loaded with 32 MPa in the machine direction, for 72 hours. Seventy two hours later, the load was released, and the film was conditioned at 23° C. and 65% RH, without any load, for 24 hours, to measure the length in the machine direction ($L1_L$) and the length in the transverse direction ($L1_W$). The dimensional change rates in the transverse direction (TD) and in the machine direction (MD) were obtained from the following formulae:

Dimensional change rate in the transverse direction $(A)(\%) = [(L1_W - LO_W)/LO_W] \times 100$ Dimensional change rate in the machine direction $(B)(\%) = [(L1_L - LO_L)/LO_L] \times 100$ Dimensional change rate ratio $= |A|/|B|$ (2) Heat Shrinkage Measured according to JIS C 2318.

Sample size: 10 mm wide, distance between two gauge marks 150 mm

Measuring conditions: 100° C., treatment time 30 minutes, no load

The 100° C. heat shrinkage was obtained from the following formula:

Heat shrinkage $(\%) = [(L_0 - L)/L_0] \times 100$ $L_0$: Distance between gauge marks before heat treatment
L: Distance between gauge marks after heat treatment (3) Elastic Modulus Measured according to the method specified in ASTM D 882, using an Instron type tensile tester under the following conditions.

Measuring instrument: Automatic film strength and elongation measuring instrument, "Tensilon AMF/RTA-100" produced by Orientec K.K.

Sample size: 0.10 mm wide, test length 100 mm

Tensile speed: 200 mm/min

Measuring environment: 23° C., 65% RH (4) Thickness Variation in the Machine Direction (%)

Film thickness tester KG601A and electronic micrometer K306C produced by Anritsu Corp. were used to continuously measure the thickness of the film sampled with a width of 30 mm and a length of 2 m in the machine direction of the film. The thickness variation was measured in the direction of first stretching. The film was fed at a speed of 3 m/min. From the maximum value $T_{max}$ ($\mu$m) and the minimum value $T_{min}$ ($\mu$m) in 2 m lengths, $R = T_{max} - T_{min}$ Was obtained, and from R and the average thickness $T_{ave}$ ($\mu$m) of 2 m lengths, Thickness variation $(\%) = (R/T_{ave}) \times 100$ was obtained.

(5) Halfwidth in the Circumferential Direction of the Diffraction Peak of Crystal Face of Film, According to Wide Angle X-Ray Diffractometry An X-ray diffractometer (Model 4036A2 (tube type) produced by K.K. Rigaku Denkisha) was used to measure under the following conditions according to the diffractometer method.

X-Ray Diffractometer

X-ray source: CuK αray (using Ni filter)

Output: 40 kV, 20 mA

Goniometer: Produced by K.K. Rigaku Denkisha

Slit: 2 mm Φ–1°–1°

Detector: Scintillation counter

Counting recorder: Model RAD-C produced by K.K. Rigaku Denkisha

At the diffraction peak position of the crystal face obtained by 2θ/θ scan, samples cut out in 2 cm×2 cm and overlaid in regular direction and the counter were fixed, and the samples were rotated in plain, to obtain a profile in the circumferential direction (β scan). Of the peak profile obtained in β scan, with the troughs at both the ends of the peak as background, the halfwidth (deg) of the peak was calculated.

(6) Temperature Expansion Coefficient (/° C.)

A 4 mm wide film sample was set to have a test length of 15 mm in TMA TM-3900 and heat control section Ta-1500 produced by Shinku Riko K.K. The film was loaded with 0.5 g at 15% RH, and the temperature was raised from room temperature (23° C.) to 50° C. and once returned to room temperature. Then, again the temperature was raised from room temperature to 50° C. At this time, the displacement (ΔL μm) of the film from 30° C. to 40° C. was measured, and the temperature expansion coefficient was calculated from the following formula.

Temperature expansion coefficient (/° C.)=(ΔL/15×10³)/(40−30)

(7) Humidity Expansion Coefficient (/% RH)

A 10 mm wide film sample was set in a tape elongation tester produced by Okura Industry, to have a test length of 200 mm, and the humidity was changed from 40% RH to 80% RH at 30° C. The displacement (ΔL mm) was measured, and the humidity expansion coefficient was calculated from the following formula.

Humidity expansion coefficient (/% RH)=(ΔL/200/)/(80−40)

(8) Density (g/cm³)

According to the density gradient tube method of JIS K 7112, the density of the film was measured using a sodium bromide aqueous solution.

(9) Refractive Index and Planar Orientation Index (fn)

The refractive index was measured according to the method specified in JIS K 7105, using an Abbe refractometer Model 4 produced by K.K. Atago, using a sodium D-line as the light source. As the mount liquid, methylene iodide was used to measure at 23° C. and 65%. RH.

The planar orientation index (fn) was obtained from the following formula using respective refractive indexes.

Planar orientation index $(fn)=(n_{MD}+n_{Td})/2-n_{ZD}$ $n_{MD}$: Refractive index in machine direction
$n_{TD}$: Refractive index in transverse direction
$n_{ZD}$: Refractive index in normal direction

(10) Glass Transition Temperature Tg, Melting Temperature Tm

Specific heat was measured according to the pseudo isothermal method using the following instrument and conditions, and the respective temperatures were determined according to JIS K 7121.

Instrument: Temperature modulated DSC produced by TA Instrument

Measuring Conditions
  Heating temperature: 270 to 570 K (RCS cooling method)
  Temperature calibration: Melting points of highly pure indium and tin
  Temperature modulation amplitude: ±1° C.
  Temperature modulation period: 60 seconds
  Temperature rise step: 5 K
  Sample weight: 5 mg
  Sample container: Open container made of aluminum (22 mg)
  Reference container: Open container made of aluminum (18 mg)

The glass transition temperature was calculated from the following formula:

Glass transition temperature=(Extrapolated onset temperature+ Extrapolated end temperature)/2

(11) Inherent Viscosity

Calculated from the following formula, using the solution viscosity measured in orthochlorophenol at 25° C.

$\eta_{sp}/C=[\eta]+K[\eta]^2 \cdot C$ where $\eta_{sp}$=(solution viscosity/solvent viscosity)−1: C is the weight of the polymer dissolved per 100 ml of the solvent (g/100 ml, usually 1.2); and K is Hunggins' constant (0.343). The solution viscosity and the solvent viscosity were measured using an Ostwald viscometer in dl/g.

(12) Creep Compliance

A 4 mm wide film was sampled, and set in TMA TM-3000 and heating control section Ta-1500 produced by Shinku Riko K.K., to have a test length of 15 mm. At 50° C., the film was loaded with 28 MPa, and kept in that state for 30 minutes. The displacement (ΔL μm) of the film in this case was measured, and the creep compliance was calculated from the following formula.

Creep compliance $(GPa^{-1})=(\Delta L/15\times10^3)/(28\times10^{-3})$

(13) Traveling Durability and Preservability Of Magnetic Tape

The polyester film of this invention was coated on the surface with a magnetic coating material with the following composition, to have a coating thickness of 2.0 μm, magnetically oriented and dried. Then, on the other side, it was coated with a back coating layer with the following composition, and calendered, being cured at 60° C. for 48 hours. The tape was slit into a ½' wide magnetic tape, and the tape with a length of 670 m was installed in a cassette, to make a cassette tape.

(Composition of Magnetic Coating Material)

| | |
|---|---|
| Ferromagnetic metallic powder | 100 parts by weight |
| Modified vinyl chloride copolymer | 10 parts by weight |
| Modified polyurethane | 10 parts by weight |
| Polyisocyanate | 5 parts by weight |
| Stearic acid | 1.5 parts by weight |
| Oleic acid | 1 part by weight |
| Carbon black | 1 part by weight |
| Alumina | 10 parts by weight |
| Methyl ethyl ketone | 75 parts by weight |
| Cyclohexanone | 75 parts by weight |
| Toluene | 75 parts by weight |

(Composition of Back Coating Layer)

| | |
|---|---|
| Carbon black (average particle size 20 nm) | 95 parts by weight |
| Carbon black (average particle size 280 nm) | 10 parts by weight |
| α-alumina | 0.1 part by weight |
| Modified polyurethane | 20 parts by weight |
| Modified vinyl chloride copolymer | 30 parts by weight |
| Cyclohexanone | 200 parts by weight |
| Methyl ethyl ketone | 300 parts by weight |
| Toluene | 100 parts by weight |

The produced cassette tape was driven to travel for 100 hours using DLTIV Drive produced by Quantum, and the traveling durability of the tape was evaluated according to the following criterion.

○: Elongation at edges of tape and bending were not found, and no abrasion mark was observed.

Δ: Elongation at edges tape and bending were not found, but some abrasion marks were observed.

X: Edges of tape partially elongated, and deformation like tangle and abrasion marks were observed.

The cassette tape in DLTIV Drive produced by Quantum had data read and was stored in 49° C. 90% RH atmosphere for 100 hours, and the data were reproduced. The tape preservability was evaluated according to the following criterion.

○: Without any track deviation, data could be normally reproduced.

Δ: Though the tape width was normal, some data could not be read.

X: The tape width changed, and data could not be read.

(14) Track Deviation and Maximum Dimensional Change Width

The cassette tape prepared as above was driven to travel under the following conditions 1 through 5 in sequence, and the dimensional change in the transverse direction was read each time. The maximum dimensional change width and the track deviation caused by traveling were obtained. The dimensional change in the transverse direction was measured in reference to the change of the distance (about 1.5 mm) from the servo to the tape. The initial distance from the servo to the tape at 20° C. and 50% RH was expressed as L0 ($\mu$m), the distance from the servo to the tape after traveling under the following condition 3, as L1 ($\mu$m), and the distance from the servo to the tape after traveling under the following condition 5, as L2 ($\mu$m).

Track deviation ($\mu$m)=|L0−L2|

Maximum dimensional change width ($\mu$m)=|L0−L1|

Condition 1: 2° C., 50% RH, tension 85 g, 3 times of traveling

Condition 2: 20° C., 50% RH, tension 140 g, 3 times of traveling

Condition 3: 40° C., 60% RH, tension 140 g, 100 times of traveling

Condition 4: 20° C., 50% RH, tension 140 g, 3 times of traveling

Condition 5: 20° C., 50% RH, tension 85 g, 3 times of traveling

(15) Suitability of Film for Processing

While a film wound with a width of 500 mm was unwound from an unwinder, it was supplied at a feed rate of 20 m/min to an oven treatment device produced by Inoue Kinzoku Kogyo Co., Ltd., heat-treated at 180° C. and wound with a length of 100 m.

A wound film that projected by more than 10 mm at an edge and became irregular due to swaying, etc. was expressed as X. A film, in which edge projection was 5 mm to 10 mm or in which wrinkling was observed during processing though the edge projection was less than 5 mm, was expressed as Δ. A film, in which edge projection was less than 5 mm while no wrinkling was observed during processing, was expressed as ○.

(16) Electromagnetic Conversion Properties (C/N)

The film was coated on the surface with a magnetic coating material and a non-magnetic coating material with the following compositions doubly using an extrusion coater (the upper layer was formed with the magnetic coating material, to have a coating thickness of 0.1 $\mu$m, and the lower layer formed with the non-magnetic layer was adequately changed in thickness), magnetically oriented and dried. Then, on the other side, the film was coated with a back coating layer with the following composition, calendered by a small test calender (steel/nylon, 5 stages) at 85° C. at a linear pressure of 200 kg/cm, and cured at 60° C. for 48 hours. The tape was slit with a width of 8 mm, and a pancake was prepared. The pancake with a length of 200 m was installed in a cassette, to make a cassette tape.

(Composition of Magnetic Coating Material)

| | |
|---|---|
| Ferromagnetic metallic powder | 100 parts by weight |
| Sodium sulfonate modified vinyl chloride copolymer | 10 parts by weight |
| Sodium sulfonate modified polyurethane | 10 parts by weight |
| Polyisocyanate | 5 parts by weight |
| Stearic acid | 1.5 parts by weight |
| Oleic acid | 1 part by weight |
| Carbon black | 1 part by weight |
| Alumina | 10 parts by weight |
| Methyl ethyl ketone | 75 parts by weight |
| Cyclohexane | 75 parts by weight |
| Toluene | 75 parts by weight |

(Composition of Non-Magnetic Under Coating Material)

| | |
|---|---|
| Titanium oxide | 100 parts by weight |
| Carbon black | 10 parts by weight |
| Sodium sulfonate modified vinyl chloride copolymer | 10 parts by weight |
| Sodium sulfonate modified polyurethane | 10 parts by weight |
| Methyl ethyl ketone | 30 parts by weight |
| Methyl isobutyl ketone | 30 parts by weight |
| Toluene | 30 parts by weight |

(Composition of Back Coating Layer)

| | |
|---|---|
| Carbon black (average particle size 20 nm) | 95 parts by weight |
| Carbon black (average particle size 280 nm) | 10 parts by weight |
| α-alumina | 0.1 part by weight |
| Zinc oxide | 0.3 part by weight |
| Sodium sulfonate modified vinyl chloride copolymer | 30 parts by weight |
| Sodium sulfonate modified polyurethane | 20 parts by weight |
| Cyclohexanone | 200 parts by weight |
| Methyl ethyl ketone | 300 parts by weight |
| Toluene | 100 parts by weight |

The C/N of this tape at 7 MHz±1 MHz was measured using a commercially available VTR for Hi8 (EV-BS3000 produced by Sony Corp.). The C/N was compared with that of a commercially available MP video tape for Hi8, and ranked as follows.

+3 dB or more: ⊚

+1 dB to less than +3 dB: ○

Less than +1 dB: X

More particular examples of this invention are described below.

EXAMPLE 1

Extruders A and B were used. The extruder A heated to 280° C. was supplied with pellets of PET-I (inherent viscosity 0.62, glass transition temperature 77° C., containing 0.38 wt % of spherical silica particles with an average size of 0.3 $\mu$m) dried beforehand in vacuum at 180° C. for 3 hours. The extruder B similarly heated to 280° C. was supplied with pellets of PET-II (inherent viscosity 0.62, glass transition temperature 77° C., containing 0.9 wt % of spherical crosslinked polystyrene particles with an average size of 0.3 μm and 0.1 wt % of spherical crosslinked polystyrene particles with an average size of 0.8 μm) dried beforehand in vacuum at 180° C. for 3 hours. Molten PET-I and PET-II were joined in a T die, and the mixture was electrostatically brought into contact with a cast drum with a surface temperature of 25° C., to be cooled and solidified, for obtaining a cast laminate film with a lamination thickness ratio of PET-I/PIT-II=15/1. The cast laminate film was stretched under the conditions shown in Table 1. At first, it was stretched in the machine direction (MD stretching 1) using a longitudinal stretcher having several heating rolls (surface material: silicone rubber) disposed, using the difference in spherical speed of the rolls, and cooled. The film was introduced into a stenter, being held at both the edges with clips, and stretched in two stages in the transverse direction (TD stretching 1-1 and 1-2). Furthermore, the film was heated by heated metallic rolls and stretched in the machine direction in two stages using a longitudinal stretcher (MD stretching 2-1 and 2-2). Then, it was introduced into a stenter, being held at both the edges with clips, and stretched in the transverse direction in two stages (TD stretching 2-1 and 2-2). In succession, it was heatset-treated at 210° C., relaxation-treated at a relaxation rate of 5.0% in the transverse direction in a 150° C. cooling zone, further relaxation-treated at a relaxation rate of 2.0% in the transverse direction in a 100° C. zone, then gradually cooled to room temperature, and wound. The film was adjusted to have a thickness of 4.3 μm by adjusting the extrusion. The surface roughness $Ra_A$ of the obtained film was 8 (μm).

Table 1 shows the film production conditions, and Tables 2 and 3 show the properties of the obtained film. As shown in Table 3, the obtained film was excellent in traveling durability, preservability, creep compliance, track deviation, maximum dimensional change width, processing suitability and electromagnetic conversion properties.

COMPARATIVE EXAMPLE 1

A biaxially oriented polyester film was produced as described for Example 1, except that the heatset treatment conditions and the relaxation treatment conditions were changed.

Table 1 shows the film production conditions, and Tables 2 and 3 show the properties of the obtained film. Since the heatset treatment and the relaxation treatment were insufficient, any film in conformity with this invention could not be obtained. The obtained film was poor in traveling durability, preservability, track deviation, maximum dimensional change width, processing suitability and electromagnetic conversion properties.

EXAMPLES 2 AND 3

As described for Example 1, a cast laminate film was obtained. The cast film was stretched under the conditions shown in Table 1. At first, it was heated and stretched in the machine direction (MD stretching 1) with a group of heating rolls (surface material: silicone rubber), and cooled. The film was introduced into a stenter, being held at both the edges with clips, and stretched in the transverse direction (TD stretching 1). Furthermore, the film was heated with heated metallic rolls and stretched in the machine direction using a longitudinal stretcher (MD stretching 2), and further introduced into a stenter, being held at both the edges with clips, then being stretched in the transverse direction (TD stretching 2). Then, as described for Example 1, it was heatset-treated and relaxation-treated at the temperatures shown in Table 1, to obtain 4.3 μm thick biaxially oriented polyester films.

Table 1 shows the film production conditions, and Tables 2 and 3 show the properties of the obtained films. As shown in Table 3, the obtained films were excellent in creep compliance, track deviation, maximum dimensional change rate, traveling durability, preservability, processing suitability and electromagnetic conversion properties.

COMPARATIVE EXAMPLES 2 AND 3

Biaxially oriented polyester films were produced as described for Example 2, except that heatset treatment conditions and relaxation treatment conditions only were changed in Comparative Example 2, and that stretching conditions, heatset treatment conditions and relaxation treatment conditions were changed without executing MD stretching 2 and TD stretching 2 in Comparative Example 3.

Table 1 shows the film production conditions and Tables 2 and 3 show the properties of the obtained films.

Since heatset treatment and relaxation treatment were insufficient, any films in conformity with this invention could not be obtained. The obtained films were poor in traveling durability, preservability, track deviation, maximum dimensional change width, processing suitability and electromagnetic conversion properties.

EXAMPLES 4 AND 5

A cast laminate film was obtained as described for Example 1, except that PEN-I (inherent viscosity 0.67, glass transition temperature 120° C., containing 0.38 wt % of spherical silica particles with an average size of 0.3 μm) was used instead of PET-I, and that PEN-II (inherent viscosity 0.67, glass transition temperature 120° C., containing 0.9 wt % of spherical crosslinked polystyrene particles with an average size of 0.3 μm and 0.1 wt % of spherical crosslinked polystyrene particles with an average size of 0.8 μm) was used instead of PET-II. Biaxially oriented polyester films with a thickness of 4.3 μm were obtained according to the conditions shown in Table 1 as described in Example 2, except that TD stretching 2 was not executed in Example 4 and that MD stretching 2 was not executed in Example 5.

Table 1 shows the film production conditions, and Table 2 and 3 show the properties of the obtained films. As shown in Table 3, the obtained films were excellent in creep compliance, traveling durability, preservability, track deviation, maximum dimensional change width, processing suitability and electromagnetic conversion properties.

COMPARATIVE EXAMPLES 4 AND 5

Biaxially oriented polyester films were obtained as described for Example 4 in Comparative Example 4, and as described for Example 5 in Comparative Example 5, except that the heatset temperature and the relaxation treatment conditions were changed.

Table 1 shows the film production conditions, and Tables 2 and 3 show the properties of the obtained films.

Since the heatset treatment and the relaxation treatment were insufficient, any films in conformity with this invention could not be obtained. The obtained films were poor in traveling durability, preservability, track deviation, maximum dimensional change width, processing suitability and electromagnetic conversion properties.

EXAMPLE 6

A cast laminate film was obtained as described for Example 1. The cast film was introduced into a simultaneous biaxial stretching stenter, being held at both the edges with clips, and simultaneously biaxially stretched under the conditions shown in Table 1. At first, it was stretched simultaneously biaxially in the machine direction and in the width direction in a 110° C. temperature zone (MD stretching 1 and TD stretching 1-1), and in succession stretched simultaneously biaxially in the machine direction and in the transverse direction in a temperature zone cooled to 75° C. (MD stretching 2 and TD stretching 1-2). Furthermore, it was simultaneously biaxially stretched in the machine direction and in the transverse direction in a 155° C. temperature zone (MD stretching 2-2 and TD stretching 2-1), and finally stretched in the transverse direction only in a 190° C. temperature zone (TD stretching 2-2). Then, as described for Example 1, a 4.3 μm thick biaxially oriented polyester film was obtained.

Table 1 shows the film production conditions, and Tables 2 and 3 show the properties of the obtained film. As shown in Table 3, the obtained film was excellent in creep compliance, traveling durability, preservability, track deviation, maximum dimensional change width, processing suitability and electromagnetic conversion properties.

TABLE 1

| | MD stretching 1 | | TD stretching 1 | | | | MD stretching 2 | |
| | | | 1st stage stretching | | 2nd stage stretching | | 1st stage stretching | |
| | Temperature (° C.) | Ratio (times) | Temperature (° C.) | Ratio (times) | Temperature (° C.) | Ratio (times) | Temperature (° C.) | Ratio (times) |
|---|---|---|---|---|---|---|---|---|
| Example 1 | 110 | 2.0 | 115 | 2.2 | 75 | 3.5 | 80 | 3.5 |
| Example 2 | 113 | 3.5 | 95 | 4.2 | | | 150 | 1.6 |
| Example 3 | 115 | 3.2 | 100 | 4.5 | | | 150 | 1.6 |
| Example 4 | 135 | 4.5 | 140 | 4.5 | | | 170 | 1.5 |
| Example 5 | 140 | 4.6 | 145 | 4.0 | | | | |
| Example 6 | Simultaneous biaxial 110° C., 2 × 2 | | | | Simultaneous biaxial 75° C., 3.3 × 3.3 | | | |
| Comparative Example 1 | 110 | 2.0 | 115 | 2.0 | 75 | 3.5 | 80 | 3.5 |
| Comparative Example 2 | 113 | 3.5 | 95 | 4.2 | | | 150 | 1.6 |
| Comparative Example 3 | 115 | 3.8 | 95 | 3.6 | | | | |
| Comparative Example 4 | 135 | 4.5 | 140 | 4.5 | | | 170 | 1.5 |
| Comparative Example 5 | 140 | 4.6 | 145 | 4.0 | | | | |

| | MD stretching 2 | | TD stretching 2 | | | | | Relaxation treatment | |
| | 2nd stage stretching | | 1st stage stretching | | 2nd stage stretching | | | 1st stage Temperature | 2nd stage Temperature |
| | Temperature (° C.) | Ratio (times) | Temperature (° C.) | Ratio (times) | Temperature (° C.) | Ratio (times) | Heatset temperature (° C.) | (° C.)/ relaxation rate (%) | (° C.)/ relaxation rate (%) |
|---|---|---|---|---|---|---|---|---|---|
| Example 1 | 130 | 1.1 | 170 | 1.2 | 190 | 1.1 | 210 | 150/5.0 | 100/2.0 |
| Example 2 | | | 200 | 1.1 | | | 215 | 140/4.5 | 120/4.0 |
| Example 3 | | | 210 | 1.1 | | | 210 | 140/4.0 | 120/3.5 |
| Example 4 | | | | | | | 220 | 160/3.5 | 125/1.8 |
| Example 5 | | | 170 | 1.4 | | | 215 | 160/4.0 | 125/1.2 |
| Example 6 | | | Simultaneous biaxial ① 155° C., 1.15 × 1.25 ② 190° C., 1.0 × 1.1 | | | | 215 | 160/4.0 | 110/2.0 |
| Comparative Example 1 | 130 | 1.1 | 170 | 1.2 | 190 | 1.1 | 200 | 150/1.8 | 110/0.4 |
| Comparative Example 2 | | | 200 | 1.1 | | | 200 | 140/1.7 | 100/0.2 |
| Comparative Example 3 | | | | | | | 200 | 150/1.4 | 100/0.2 |
| Comparative Example 4 | | | | | | | 200 | 160/1.5 | 135/0.4 |
| Comparative Example 5 | | | 170 | 1.4 | | | 200 | 160/1.7 | 135/0.3 |

Note:
MD = Machine direction
TD = Transverse direction
Simultaneous biaxial stretching: Stretching temperature, MD stretching ratio × TD stretching ratio

TABLE 2

| | TD dimensional change rate (%) | TD/MD dimensional change rate ratio (absolute value) | TD 100° C. heat shrinkage (%) | Elastic modulus MD/TD (Gpa) | Thickness variation in machine direction (%) | Halfwidth in circumferential direction (degrees) | Temperature expansion coefficient MD/TD ($*10^{-6}/°$ C.) | Humidity expansion coefficient MD/TD ($*10^{-6}/\%$) |
|---|---|---|---|---|---|---|---|---|
| Example 1 | −0.22 | 0.4 | 0.3 | 6.9/8.0 | 3.6 | 80 | 0.8/−4.0 | 6.2/4.5 |
| Example 2 | −0.23 | 0.5 | 0.3 | 6.8/5.4 | 2.4 | 50 | −1.8/3.8 | 6.3/9.2 |
| Example 3 | −0.29 | 0.5 | 0.5 | 5.9/6.2 | 3.0 | 51 | 3.7/−1.5 | 8.0/7.8 |
| Example 4 | −0.30 | 0.8 | 0.3 | 9.2/6.8 | 3.0 | 50 | −5.0/6.1 | 6.9/11.5 |
| Example 5 | −0.27 | 0.5 | 0.1 | 6.5/9.3 | 2.8 | 50 | 1.6/−6.3 | 10.9/6.9 |
| Example 6 | −0.26 | 0.7 | 0.4 | 6.8/7.8 | 3.2 | 85 | 0.6/−3.7 | 6.7/5.1 |
| Comparative Example 1 | −0.36 | 1.5 | 1.5 | 6.4/8.4 | 5.3 | 82 | 1.1/−6.5 | 6.9/4.1 |
| Comparative Example 2 | −0.34 | 1.1 | 0.7 | 6.6/6.0 | 5.5 | 48 | −1.5/2.1 | 6.5/7.5 |
| Comparative Example 3 | −0.50 | 1.3 | 0.6 | 4.9/6.0 | 6.8 | 45 | 1.5/0.5 | 10.5/7.6 |
| Comparative Example 4 | −0.35 | 1.2 | 0.6 | 6.0/9.5 | 5.6 | 48 | 2.1/−7.5 | 11.5/7.1 |
| Comparative Example 5 | −0.44 | 1.1 | 0.6 | 8.8/7.0 | 6.2 | 45 | −6.1/3.9 | 8.2/10.5 |

TABLE 3

| | Creep compliance MD/TD (Gpa$^{-1}$) | Traveling durability | Preservability | Track deviation (μm) | Maximum dimension change rate (μm) | Processing suitability | Electromagnetic conversion properties |
|---|---|---|---|---|---|---|---|
| Example 1 | 0.32/0.20 | ○ | ○ | 0.5 | 1.8 | ○ | ⊙ |
| Example 2 | 0.27/0.35 | ○ | ○ | 0.7 | 2.1 | ○ | ⊙ |
| Example 3 | 0.35/0.26 | ○ | ○ | 0.8 | 2.3 | ○ | ⊙ |
| Example 4 | 0.25/0.34 | ○ | ○ | 0.9 | 2.9 | ○ | ⊙ |
| Example 5 | 0.34/0.26 | ○ | ○ | 0.9 | 2.7 | ○ | ⊙ |
| Example 6 | 0.29/0.26 | ○ | ○ | 1.0 | 2.9 | ○ | ⊙ |
| Comparative Example 1 | 0.36/0.21 | Δ | x | 1.3 | 3.3 | x | x |
| Comparative Example 2 | 0.23/0.39 | x | x | 1.4 | 3.5 | x | x |
| Comparative Example 3 | 0.43/0.40 | x | x | 2.3 | 3.8 | x | x |
| Comparative Example 4 | 0.41/0.27 | x | x | 2.4 | 3.5 | x | x |
| Comparative Example 5 | 0.32/0.36 | x | x | 2.9 | 3.7 | x | x |

EXAMPLES 7 AND 8

As described for Example 1, a cast laminate film was obtained. The cast film was stretched under the conditions shown in Table 4. At first, the cast film was heated and stretched in two stages in the machine direction with a group of heating rolls (surface material: silicone rubber) (MD stretching 1-1 and 1-2), and cooled. The film was introduced into a stenter, being held at both the edges with clips and stretched in the transverse direction (TD stretching 1-1), and further stretched in the transverse direction at a small ratio (TD stretching 1-2). Furthermore, it was stretched in the machine direction by a longitudinal stretcher (MD stretching 2), stretched in the transverse direction by a stenter (TD stretching 2), and heatset-treated and relaxation-treated. Then, as described for Example 1, 4.5 μm thick biaxially oriented polyester films were obtained.

Table 4 shows the film production conditions, and Tables 5 and 6 show the properties of the obtained films. As shown in Table 6, the obtained films were excellent in creep compliance, traveling durability, preservability, track deviation, maximum dimensional change width, processing suitability and electromagnetic conversion properties.

COMPARATIVE EXAMPLE 6

A biaxially oriented polyester film was produced as described for Example 7, except that the stretching at a small ratio in the transverse direction (TD stretching 1-2) was not executed after the 1$^{st}$ stage stretching in the transverse direction (TD stretching 1-1).

Table 4 shows the film production conditions, and Tables 5 and 6 show the properties of the obtained film.

Since the stretching at a small ratio in the transverse direction was insufficient and since the relaxation treatment was insufficient, any film in conformity with this invention could not be obtained. The obtained film was poor in traveling durability, preservability, track deviation, maximum dimensional change width and processing suitability.

EXAMPLES 9 AND 10

Biaxially oriented polyester films were produced as described for Example 2, except that the same PET raw material as used in Example 1 was used in Example 9, and that the same PEN raw material as used in Example 4 was used while stretching at a small ratio in the transverse direction (TD stretching 1-2) was further executed after the 1$^{st}$ stage stretching in the transverse direction (TD stretching 1-1) in Example 10.

Table 4 shows the film production conditions, and Tables 5 and 6 show the properties of the obtained films. As shown in Table 6, the obtained films were excellent in creep

EXAMPLE 11

A cast laminate film was obtained as described for Example 6, and the 1$^{st}$ stage stretching was executed by a simultaneously biaxial stenter (MD stretching 1 and TD stretching 1-1), and stretching at a small ratio in the transverse direction only was executed (TD stretching 1-2). Furthermore; the second simultaneous biaxial stretching (MD stretching 2 and TD stretching 2) was executed, and heatset-treatment and relaxation treatment were executed.

Table 4 shows the film production conditions, and Tables 5 and 6 show the properties of the obtained film. As shown in Table 6, the obtained film was excellent in creep compliance, traveling durability, preservability, track deviation, maximum dimensional change width, processing suitability and electromagnetic conversion properties.

COMPARATIVE EXAMPLE 7

A biaxially oriented polyester film was produced as described for Example 11, except that the stretching at a small ratio in the transverse direction (TD stretching 1-2) was not executed after the 1$^{st}$ stage simultaneous biaxial stretching (MD stretching 1 and TD stretching 1-1).

Table 4 shows the film production conditions, and Tables 5 and 6 show the properties of the obtained film.

Since the stretching at a small ratio in the transverse direction was not executed, any film in conformity with this invention could not be obtained. The obtained film was poor in traveling durability, preservability, track deviation, maximum dimensional change width, processing suitability and electromagnetic conversion properties.

TABLE 4

|  | MD stretching 1 | | | | TD stretching 1 | | | |
|---|---|---|---|---|---|---|---|---|
|  | 1$^{st}$ stage stretching | | 2$^{nd}$ stage stretching | | 1$^{st}$ stage stretching | | 2$^{nd}$ stage stretching | |
|  | Temperature (° C.) | Ratio (times) | Temperature (° C.) | Ratio (times) | Temperature (° C.) | Ratio (times) | Temperature (° C.) | Ratio (times) |
| Example 7 | 105 | 2.0 | 80 | 2.6 | 90 | 3.7 | 110 | 1.15 |
| Example 8 | 110 | 2.0 | 80 | 2.5 | 85 | 3.9 | 110 | 1.10 |
| Example 9 | 115 | 3.7 |  |  | 95 | 3.8 | 109 | 1.15 |
| Example 10 | 138 | 3.4 |  |  | 125 | 4.0 | 138 | 1.20 |
| Example 11 | Simultaneous biaxial 95° C., 3.6 × 3.0 | | | | | | 112 | 1.20 |
| Comparative Example 6 | 110 | 2.0 | 90 | 2.3 | 85 | 4.2 |  |  |
| Comparative Example 7 | Simultaneous biaxial 98° C., 3.6 × 3.2 | | | | | | | |

|  | MD stretching 2 | | TD stretching 2 | | Heatset temperature (° C.) | Relaxation treatment | |
|---|---|---|---|---|---|---|---|
|  |  |  |  |  |  | 1$^{st}$ stage Temperature (° C.)/ relaxation rate (%) | 2$^{nd}$ stage Temperature (° C.)/ relaxation rate (%) |
|  | Temperature (° C.) | Ratio (times) | Temperature (° C.) | Ratio (times) |  |  |  |
| Example 7 | 145 | 1.3 | 190 | 1.1 | 210 | 130/2.8 | 110/1.5 |
| Example 8 | 145 | 1.2 | 190 | 1.2 | 210 | 150/4.0 | 110/2.5 |
| Example 9 | 145 | 1.6 | 193 | 1.1 | 215 | 145/3.9 | 120/2.8 |
| Example 10 | 165 | 1.3 | 195 | 1.2 | 216 | 150/3.5 | 120/2.1 |
| Example 11 | Simultaneous biaxial 158° C., 1.7 × 1.3 | | | | 215 | 145/4.3 | 110/2.0 |
| Comparative Example 6 | 143 | 1.1 | 190 | 1.2 | 210 | 130/2.1 | 115/0.5 |
| Comparative Example 7 | Simultaneous biaxial 160° C., 1.6 × 1.2 | | | | 211 | 150/3.8 | 120/2.1 |

Note:
MD = Machine direction
TD = Transverse direction
Simultaneous biaxial stretching: Stretching temperature, MD stretching ratio × TD stretching ratio

TABLE 5

|  | TD dimensional change rate (%) | TD/MD dimensional change rate ratio (absolute value) | TD 100° C. heat shrinkage (%) | Elastic modulus MD/TD (Gpa) | Thickness variation in machine direction (%) | Temperature expansion coefficient MD/TD ($*10^{-6}$/° C.) | Humidity expansion coefficient MD/TD ($*10^{-6}$/%) |
|---|---|---|---|---|---|---|---|
| Example 7 | −0.12 | 0.3 | 0.4 | 8.5/4.7 | 3.5 | −3.9/7.2 | 5.3/10.2 |
| Example 8 | −0.08 | 0.2 | 0.1 | 8.5/5.0 | 3.6 | −3.9/6.9 | 5.4/9.9 |
| Example 9 | −0.18 | 0.4 | 0.3 | 7.2/5.3 | 2.4 | −1.6/6.1 | 6.1/9.5 |
| Example 10 | −0.24 | 0.5 | 0.2 | 6.9/11.5 | 3.0 | 4.1/−7.4 | 11.8/5.6 |
| Example 11 | −0.23 | 0.5 | 0.1 | 7.5/5.0 | 2.8 | −1.9/7.0 | 5.8/9.8 |

TABLE 5-continued

|  | TD dimensional change rate (%) | TD/MD dimensional change rate ratio (absolute value) | TD 100° C. heat shrinkage (%) | Elastic modulus MD/TD (Gpa) | Thickness variation in machine direction (%) | Temperature expansion coefficient MD/TD (*$10^{-6}$/° C.) | Humidity expansion coefficient MD/TD (*$10^{-6}$/%) |
|---|---|---|---|---|---|---|---|
| Comparative Example 6 | −0.36 | 1.2 | 1.5 | 7.9/4.5 | 5.3 | −2.5/7.1 | 5.6/10.1 |
| Comparative Example 7 | −0.34 | 1.1 | 0.4 | 7.2/3.9 | 5.5 | −1.4/15.0 | 5.9/13.5 |

TABLE 6

|  | Creep compliance MD/TD (Gpa$^{-1}$) | Traveling durability | Preservability | Track deviation (μm) | Maximum dimension change rate (μm) | Processing suitability | Electromagnetic conversion properties |
|---|---|---|---|---|---|---|---|
| Example 7 | 0.20/0.47 | ○ | ○ | 0.8 | 2.2 | ○ | ⊚ |
| Example 8 | 0.19/0.45 | ○ | ○ | 0.7 | 2.1 | ○ | ⊚ |
| Example 9 | 0.25/0.35 | ○ | ○ | 0.8 | 2.3 | ○ | ⊚ |
| Example 10 | 0.34/0.22 | ○ | ○ | 0.9 | 2.7 | ○ | ⊚ |
| Example 11 | 0.24/0.46 | ○ | ○ | 0.9 | 2.9 | ○ | ⊚ |
| Comparative Example 6 | 0.23/0.51 | Δ | x | 1.8 | 3.9 | x | ○ |
| Comparative Example 7 | 0.25/0.60 | Δ | x | 1.5 | 3.5 | x | x |

EXAMPLE 12

Pellets of PET-III (inherent viscosity 0.85) (50 wt %) and pellets of PEI ("Ultem" 1010 (registered trade mark of General Electric)) (50 wt %) were supplied into a vented double-screw kneading extruder heated to 280° C., and the mixture was melt-extruded at a shear rate of 100 sec$^{-1}$, taking a residence time of 1 minute, to obtain pellets containing 50 wt % of PEI. The obtained PEI-containing pellets and pellets of PET-IV (inherent viscosity 0.62, containing 0.4 wt % of spherical crosslinked polystyrene particles with an average size of 0.3 μm) were dry-blended at a ratio of 20:80. The blend was dried in vacuum at 180° C. for 3 hours, supplied into an extruder, melt-extruded at 280° C., and fed through a fiber stainless steel filter (10 μm cut) at a shear rate of 10 sec$^{-1}$, and discharged as a sheet from a T die. The sheet was brought into contact with a cooling drum with a surface temperature of 25° C. according to an electrostatic method using a tape-formed (0.04 mm thick, 7.2 mm wide) electrode, to be cooled and solidified, for obtaining a cast film containing 10 wt % of PEI. The cast film was stretched under the conditions shown in Table 7. At first, it was stretched in the machine direction using a longitudinal stretcher having several roles disposed, using the difference in peripheral speed of the rolls (MD stretching 1), and in succession stretched in the transverse direction by a stenter (TD stretching 1). Furthermore, it was stretched in the machine direction for the second time by a roll longitudinal stretcher (MD stretching 2), and stretched in the transverse direction for the second time by a stenter (TD stretching 2). Then, it was heatset-treated at 210° C., and relaxation-treated at a relaxation rate of 2.2% in the transverse direction in a 120° C. cooling zone, further relaxation-treated at a relaxation rate of 1.0% in the transverse direction in a 100° C. zone, then gradually cooled to room temperature, and wound. The film was adjusted to have a thickness of 5.5 μm by adjusting the extrusion. The obtained film had a single Tg.

Table 7 shows the film production conditions, and Tables 8 and 9 show the properties of the obtained film. As shown in Table 9, the obtained film was excellent in creep compliance, traveling durability, preservability, track deviation, maximum dimensional change width, processing suitability and electromagnetic conversion properties.

EXAMPLES 13 AND 14

Biaxially oriented polyester films were produced as described for Example 12, except that PEN-III (inherent viscosity 0.67, containing 0.4 wt % of spherical crosslinked polystyrene particles with an average size of 0.3 μm) and the same PEI as used in Example 12 were dry-blended at a ratio of 90:10 for use as the raw material in Example 13, and that the second stretching in the transverse direction (TD stretching 2) was not executed in Example 14. The obtained films had a single Tg respectively.

Table 7 shows the film production conditions, and Tables 8 and 9 show the properties of the obtained films. As shown in Table 9, the obtained films were excellent in creep compliance, traveling durability, preservability, track deviation, maximum dimensional change width, processing suitability and electromagnetic conversion properties.

COMPARATIVE EXAMPLES 8–11

A biaxially oriented polyester film was produced as described for Example 12, except that the PEI content was set at 3% by changing the dry blend ratio of the PEI-containing pellets and PET-IV in Comparative Example 8. A biaxially oriented polyester film was produced as described for Example 12, except that the PEI content was set at 40% by changing the dry blend ratio of PEI-containing pellets and PET-IV in Comparative Example 9. A biaxially oriented polyester film was produced as described for Example 12, except that a wire electrode (diameter 0.20 mmφ) was used instead of a tape electrode when the sheet was electrostatically brought into contact with the cooling drum in Comparative Example 10. A biaxially oriented polyester film was produced as described for Example 12, except that the relaxation-treatment was not executed in Comparative Example 11. All the obtained films had a single Tg respectively.

Table 7 shows the film production conditions, and Tables 8 and 9 show the properties of the obtained films. Any films in conformity with this invention could not be obtained. The obtained films were poor in traveling durability, preservability, track deviation, maximum dimensional change width and processing suitability.

EXAMPLE 15

PET and PEI were kneaded as described for Example 12, to obtain pellets (PET/PEI-I) containing 50 wt % of PEI. Extruders A and B were used. The extruder A heated to 280° C. was supplied with a dry blend (PET/PEI-II) consisting of PET/PEI-I and pellets of PET-V (inherent viscosity 0.73, containing 0.4 wt % of spherical crosslinked polystyrene particles with an average size of 0.3 μm) at 20:80 dried beforehand in vacuum at 180° C. for 3 hours, and the extruder B similarly heated to 280° C. was supplied with a dry blend (PET/PEI-III) consisting of PET/PEI-I and pellets of PET-VI (inherent viscosity 0.73, containing 1.0 wt % of spherical crosslinked polystyrene particles with an average size of 0.3 μm and 0.1 wt % of spherical crosslinked polystyrene particles with an average size of 0.8 μm) at 20:80 dried beforehand in vacuum at 180° C. for 3 hours. The polymers were respectively fed through a fiber stainless steel filter (10 μm cut) at a shear rate of 10 sec$^{-1}$ and joined in a T die, then being electrostatically brought into contact with a cast drum with a surface temperature of 25° C., to be cooled and solidified, for obtaining a cast laminate film with a lamination thickness ratio of (PET/PEI-II)/(PET/PEI-III)= 14/1. This cast laminate film was processed as described for Example 12, except that it was stretched at a small ratio in the transverse direction (TD stretching 1-2) after it was stretched in the 1$^{st}$ stage in the transverse direction (TD stretching 1-1), to obtain a biaxially oriented polyester film. The obtained film had a single Tg.

Table 7 shows the film production conditions, and Tables 8 and 9 show the properties of the obtained film. As shown in Table 9, the obtained film was excellent in creep compliance, traveling durability, preservability, track deviation, maximum dimensional change width, processing suitability and electromagnetic conversion properties.

EXAMPLE 16

Extruders A and b were used. A biaxially oriented polyester film was produced as described for Example 15, except that a cast laminate film with a PEI content of 15 wt % was obtained by supplying the extruder A with a dry blend consisting of pellets of PEI and pellets of PEN-III at 15:85 dried beforehand in vacuum, and supplying the extruder B with pellets of PEI and pellets of PEN-IV (inherent viscosity 0.67, containing 1.0 wt % of spherical crosslinked polystyrene particles with an average size of 0.3 μm and 0.1 wt % of spherical crosslinked polystyrene particles with an average size of 0.8 μm) at 15:85 dried beforehand in vacuum. The obtained film had a single Tg.

Table 7 shows the film production conditions, and Tables 8 and 9 show the properties of the obtained film. As shown in Table 9, the obtained film was excellent in creep compliance, traveling durability, preservability, track deviation, maximum dimensional change width, processing suitability and electromagnetic conversion properties.

EXAMPLE 17

As described for Example 12, a cast film containing 20 wt % of PEI was obtained. The cast film was stretched under the conditions shown in Table 7. At first, it was stretched in the machine direction using a longitudinal stretcher (MD stretching 1-1), cooled, and stretched again in the machine direction (MD stretching 1-2). In succession, it was stretched in the transverse direction by a stenter (TD stretching 1), stretched in the machine direction for the second time by a longitudinal roll stretcher (MD stretching 2), and stretched in the transverse direction for the second time by a stenter (TD stretching 2). It was further heatset-treated at 209° C. and relaxation-treated at a relaxation rate of 2.3% in the transverse direction in a 123° C. cooling zone, further relaxation-treated at a relaxation rate of 0.9% in the transverse direction in a 105° C. zone, then gradually cooled to room temperature, and wound. The film was adjusted to have a thickness of 5.4 μm by adjusting the extrusion. The obtained film had a single Tg.

Table 7 shows the film production conditions, and Tables 8 and 9 show the properties of the obtained film. As shown in Table 9, the obtained film was excellent in creep compliance, traveling durability, preservability, track deviation, maximum dimensional change width, processing suitability and electromagnetic conversion properties.

COMPARATIVE EXAMPLE 12

A biaxially oriented polyester film was produced as described for Example 17, except that the stretching conditions were changed as shown in Table 7 and that the heatset-treatment and relaxation treatment were not executed. The obtained film had a single Tg.

Table 7 shows the film production conditions, and Tables 8 and 9 show the properties of the obtained film. Since heatset-treatment and relaxation treatment were insufficient, any film in conformity with this invention could not be obtained. The obtained film was poor in traveling durability, preservability, track deviation, maximum dimensional change width, processing suitability and electromagnetic conversion properties.

EXAMPLE 18

A cast film was obtained as described for Example 12. It was introduced into a simultaneous biaxial stenter, being held at both the edges with clips, and stretched simultaneously biaxially (MD stretching 1 and TD stretching 1) under the conditions shown in Table 7. The film was stretched in the machine direction for the second time by a longitudinal roll stretcher (MD stretching 2), and stretched in the transverse direction for the second time by a stenter (TD stretching 2). It was heatset-treated at 215° C., relaxation-treated at a relaxation rate of 2.1% in the transverse direction in a 120° C. zone, further relaxation-treated at a relaxation rate of 1.1 in the transverse direction in a 102° C. zone, then gradually cooled to room temperature, and wound. The film was adjusted to have a thickness of 5.2 μm by adjusting the extrusion. The obtained film had a single Tg.

Table 7 shows the film production conditions, and Tables 8 and 9 show the properties of the obtained film. As shown in Table 9, the obtained film was excellent in creep compliance, traveling durability, preservability, track deviation, maximum dimensional change width, processing suitability and electromagnetic conversion properties.

EXAMPLE 19

As described for Example 12, a film was stretched, heatset-treated, relaxation-treated, gradually cooled and wound. The obtained film was heat-treated in a hot air oven adjusted to 70° C. for 168 hours as a roll.

Table 7 shows the film production conditions, and Tables 8 and 9 show the properties of the obtained film. As shown in Table 9, the obtained film was excellent in creep compliance, traveling durability, preservability, track deviation, maximum dimensional change width, processing suitability and electromagnetic conversion properties.

TABLE 7

| | | MD stretching 1 | | | | TD stretching 1 | | | |
| | | 1st stage stretching | | 2nd stage stretching | | 1st stage stretching | | 2nd stage stretching | |
| | PEI content | Temperature (°C.) | Ratio (times) | Temperature (°C.) | Ratio (times) | Temperature (°C.) | Ratio (times) | Temperature (°C.) | Ratio (times) |
|---|---|---|---|---|---|---|---|---|---|
| Example 12 | 10 | 115 | 3.4 | | | 110 | 3.8 | | |
| Example 13 | 10 | 140 | 3.2 | | | 140 | 4.2 | | |
| Example 14 | 10 | 115 | 3.5 | | | 110 | 4.0 | | |
| Example 15 | 10 | 120 | 3.6 | | | 113 | 3.8 | 110 | 1.10 |
| Example 16 | 15 | 140 | 3.4 | | | 132 | 3.1 | 140 | 1.10 |
| Example 17 | 20 | 125 | 2.0 | 105 | 2.3 | 110 | 3.4 | | |
| Example 18 | 10 | Simultaneous biaxial 115° C., 3.0 × 3.0 | | | | | | | |
| Example 19 | 10 | 115 | 3.5 | | | 110 | 3.7 | | |
| Comparative Example 8 | 3 | 110 | 3.4 | | | 105 | 3.5 | | |
| Comparative Example 9 | 40 | 135 | 3.4 | | | 130 | 3.5 | | |
| Comparative Example 10 | 10 | 115 | 3.5 | | | 110 | 3.6 | | |
| Comparative Example 11 | 10 | 135 | 3.4 | | | 110 | 3.6 | | |
| Comparative Example 12 | 20 | 125 | 2.0 | 105 | 2.2 | 110 | 3.3 | | |

| | MD stretching 2 | | TD stretching 2 | | Heatset | Relaxation treatment | | Heat treatment as roll |
| | | | | | | 1st stage Temperature (°C.)/ | 2nd stage Temperature (°C.)/ | Temperature |
| | Temperature (°C.) | Ratio (times) | Temperature (°C.) | Ratio (times) | temperature (°C.) | relaxation rate (%) | relaxation rate (%) | (°C.)/ Times (hrs) |
|---|---|---|---|---|---|---|---|---|
| Example 12 | 145 | 1.6 | 190 | 1.1 | 210 | 120/2.2 | 100/1.0 | |
| Example 13 | 170 | 1.5 | 192 | 1.5 | 225 | 150/1.5 | 105/0.5 | |
| Example 14 | 140 | 1.7 | | | 210 | 120/2.0 | 102/0.8 | |
| Example 15 | 145 | 1.6 | 195 | 1.1 | 210 | 120/2.0 | 102/0.8 | |
| Example 16 | 166 | 1.8 | 196 | 1.2 | 215 | 123/2.1 | 108/1.0 | |
| Example 17 | 155 | 1.5 | 190 | 1.3 | 209 | 123/2.3 | 105/0.9 | |
| Example 18 | 140 | 1.5 | 185 | 1.2 | 215 | 120/2.1 | 102/1.1 | |
| Example 19 | 145 | 1.7 | 190 | 1.3 | 210 | 120/2.1 | 100/0.7 | 70/168 |
| Comparative Example 8 | 135 | 1.8 | 190 | 1.1 | 209 | 120/1.5 | 100/0.5 | |
| Comparative Example 9 | 155 | 1.3 | 220 | 1.1 | 220 | 128/2.4 | 103/0.5 | |
| Comparative Example 10 | 150 | 1.5 | 180 | 1.2 | 210 | 122/1.9 | 100/0.2 | |
| Comparative Example 11 | 140 | 1.5 | 190 | 1.1 | 209 | | | |
| Comparative Example 12 | 155 | 1.4 | 192 | 1.3 | | | | |

Note:
MD = Machine direction
TD = Transverse direction
Simultaneous biaxial stretching: Stretching temperature, MD stretching ratio × TD stretching ratio

TABLE 8

| | TD dimensional change rate (%) | TD/MD dimensional change rate ratio (absolute value) | Glass transition temperature (°C.) | TD 100° C. heat shrinkage (%) | Elastic modulus MD/TD (Gpa) | Thickness variation in machine direction (%) | Temperature expansion coefficient MD/TD (*10⁻⁶/°C.) | Humidity expansion coefficient MD/TD (*10⁻⁶/%) |
|---|---|---|---|---|---|---|---|---|
| Example 12 | −0.08 | 0.17 | 115 | 0.05 | 6.1/4.7 | 1.5 | 5.1/12.3 | 7.0/10.2 |
| Example 13 | −0.27 | 0.51 | 140 | 0.10 | 6.2/9.1 | 2.1 | 5.4/−5.0 | 11.3/7.2 |
| Example 14 | −0.28 | 0.45 | 113 | 0.08 | 6.6/4.1 | 3.2 | 3.0/13.2 | 6.2/10.8 |
| Example 15 | −0.05 | 0.17 | 115 | 0.05 | 7.1/4.7 | 1.5 | 3.5/12.1 | 4.6/10.1 |
| Example 16 | −0.25 | 0.50 | 140 | 0.12 | 8.5/7.0 | 2.8 | −4.5/−2.5 | 7.7/10.5 |
| Example 17 | −0.07 | 0.42 | 123 | 0.03 | 7.3/4.4 | 2.4 | −3.0/13.2 | 4.9/9.7 |
| Example 18 | −0.27 | 0.62 | 115 | 0.11 | 5.8/4.2 | 3.7 | 7.4/14.1 | 7.6/11.2 |
| Example 19 | −0.04 | 0.19 | 114 | 0.03 | 6.1/4.3 | 2.9 | 4.1/13.5 | 6.5/9.8 |
| Comparative Example 8 | −0.42 | 0.57 | 105 | 1.40 | 6.6/5.0 | 3.5 | −2.5/5.5 | 5.8/9.3 |

TABLE 8-continued

|  | TD dimensional change rate (%) | TD/MD dimensional change rate ratio (absolute value) | Glass transition temperature (° C.) | TD 100° C. heat shrinkage (%) | Elastic modulus MD/TD (Gpa) | Thickness variation in machine direction (%) | Temperature expansion coefficient MD/TD (*10⁻⁶/° C.) | Humidity expansion coefficient MD/TD (*10⁻⁶/%) |
|---|---|---|---|---|---|---|---|---|
| Comparative Example 9 | −0.48 | 0.89 | 137 | 0.09 | 4.9/3.5 | 4.1 | 12.1/19.5 | 9.2/15.8 |
| Comparative Example 10 | −0.31 | 0.72 | 114 | 0.07 | 5.9/4.3 | 5.5 | 7.2/13.8 | 7.1/11.6 |
| Comparative Example 11 | −0.39 | 1.10 | 109 | 0.57 | 5.5/4.1 | 6.8 | 8.8/16.3 | 8.5/13.5 |
| Comparative Example 12 | −0.50 | 1.54 | 119 | 0.51 | 6.4/3.8 | 4.6 | 9.3/20.2 | 8.9/16.2 |

TABLE 9

|  | Creep compliance MD/TD (Gpa⁻¹) | Traveling durability | Preservability | Track deviation (μm) | Maximum dimension change rate (μm) | Processing suitability | Electromagnetic conversion properties |
|---|---|---|---|---|---|---|---|
| Example 12 | 0.27/0.40 | ○ | ○ | 0.6 | 2.0 | ○ | ⊚ |
| Example 13 | 0.32/0.24 | ○ | ○ | 0.8 | 2.7 | ○ | ⊚ |
| Example 14 | 0.24/0.43 | ○ | ○ | 0.9 | 2.9 | ○ | ⊚ |
| Example 15 | 0.23/0.39 | ○ | ○ | 0.5 | 1.9 | ○ | ⊚ |
| Example 16 | 0.28/0.30 | ○ | ○ | 0.7 | 2.6 | ○ | ⊚ |
| Example 17 | 0.22/0.41 | ○ | ○ | 0.5 | 1.8 | ○ | ⊚ |
| Example 18 | 0.29/0.45 | ○ | ○ | 0.8 | 2.8 | ○ | ⊚ |
| Example 19 | 0.25/0.41 | ○ | ○ | 0.4 | 1.5 | ○ | ⊚ |
| Comparative Example 8 | 0.26/0.39 | Δ | Δ | 2.2 | 4.2 | x | ○ |
| Comparative Example 9 | 0.40/0.51 | x | x | 2.7 | 4.8 | Δ | x |
| Comparative Example 10 | 0.29/0.44 | Δ | Δ | 1.8 | 3.4 | x | x |
| Comparative Example 11 | 0.37/0.46 | x | x | 2.8 | 5.1 | x | x |
| Comparative Example 12 | 0.39/0.54 | x | x | 3.4 | 6.0 | x | x |

COMPARATIVE EXAMPLE 13

PET-VII (inherent viscosity 0.56 dl/g, containing 0.01 wt % of crosslinked silicone resin particles with an average particle size of 0.6 μm and 0.3 wt % of alumina particles with an average particle size of 0.1 μm) was dried at 170° C. for 3 hours, melt-extruded at 300° C. and quickly cooled and solidified on a cast drum kept at 25° C., to obtain a cast film. The cast film was preheated to 75° C., heated and stretched to 2.25 times between a low speed roll and a high speed roll, using an IR heater with a surface temperature of 830° C. located at 14 mm above, quickly cooled, in succession supplied into a stenter, and stretched to 3.6 times in the transverse direction at 110° C. Furthermore in succession, it was preheated to 110° C., and stretched in the machine direction to 2.5 times between a low speed roll and a high speed roll, supplied further into a stenter, and heatset-treated at 240° C. for 2 seconds, to obtain a 6.0 μm thick film.

Tables 10 and 11 show the properties of the obtained film. Since no relaxation-treatment was executed, the heat shrinkage in the transverse direction was large. Any film in conformity with this invention could not be obtained. The obtained film was poor in traveling durability, preservability, track deviation, maximum dimensional change width, processing suitability and electromagnetic conversion properties.

COMPARATIVE EXAMPLE 14

PEN-V (inherent viscosity 0.63 dl/g, containing 0.2 wt % of monodisperse silica particles with an average particle size of 0.1 μm and 0.0151 wt % of calcium carbonate particles with an average particle size of 0.6 μm) was dried at 180° C. for 5 hours, melt-extruded at 300° C., and quickly cooled and solidified on a cast drum kept at 60° C., to obtain a cast film. The cast film was stretched in the machine direction to 5.2 times at 120° C. between two rolls different in speed, stretched to 4.3 times in the transverse direction by a stenter, and heat-treated at 220° C. for 15 seconds. Thus, a 6 μm thick biaxially oriented film was obtained and wound.

Tables 10 and 11 show the properties of the obtained film. Since no relaxation treatment was executed, the heat shrinkage in the transverse direction was large. Any film in conformity with this invention could not be obtained. The obtained film was poor in traveling durability, preservability, track deviation, maximum dimensional change width, processing suitability and electromagnetic conversion properties.

TABLE 10

| | TD dimensional change rate (%) | TD/MD dimensional change rate ratio (absolute value) | TD 100° C. heat shrinkage (%) | Elastic modulus MD/TD (Gpa) | Thickness variation in machine direction (%) | Temperature expansion coefficient MD/TD ($*10^{-6}$/° C.) | Humidity expansion coefficient MD/TD ($*10^{-6}$/%) |
|---|---|---|---|---|---|---|---|
| Comparative Example 13 | −0.45 | 1.1 | 1.8 | 7.8/4.7 | 6.5 | −2.5/7.0 | 5.5/11.0 |
| Comparative Example 14 | −0.51 | 1.2 | 0.6 | 8.7/5.7 | 3.6 | −3.2/3.2 | 7.2/13.0 |

TABLE 11

| | Creep compliance MD/TD (Gpa$^{-1}$) | Traveling durability | Preservability | Track deviation (μm) | Maximum dimension change rate (μm) | Processing suitability | Electromagnetic conversion properties |
|---|---|---|---|---|---|---|---|
| Comparative Example 13 | 0.24/0.45 | x | x | 2.8 | 3.9 | x | x |
| Comparative Example 14 | 0.30/0.46 | x | x | 3.0 | 4.1 | x | x |

INDUSTRIAL APPLICABILITY

The polyester film of this invention is small in track deviation and excellent in traveling durability and preservability, being very high in industrial value.

What is claimed is:

1. A biaxially oriented polyester film, characterized in that the dimensional change rate (A) in the transverse direction of the film is in a range of −0.3 to 0% when the film is allowed to stand at 49° C. and 90% RH for 72 hours, while being loaded with 32 MPa in the machine direction.

2. A biaxially oriented polyester film, according to claim 1, wherein the ratio of the dimensional change rate (A) in the transverse direction under the conditions of claim 1 to the dimensional change rate (B) in the machine direction respectively in absolute value (|A|/|B|) is in a range of 0.1 to 1.0.

3. A biaxially oriented polyester film, according to claim 1, wherein the heat shrinkage in the transverse direction at 100° C. is in a range of 0 to 0.5%.

4. A biaxially oriented polyester film, according to claim 1, wherein the sum of the elastic modulus in the machine direction and that in the transverse direction is in a range of 9 to 30 GPa.

5. A biaxially oriented polyester film, according to claim 1, wherein the thickness variation in the machine direction is 5% or less.

6. A biaxially oriented polyester film, according to claim 1, which contains a polyether imide.

7. A biaxially oriented polyester film, according to claim 6, wherein the content of the polyether imide is 5 to 30 wt %.

8. A biaxially oriented polyester film, according to claim 7, which has a single glass transition temperature.

9. A biaxially oriented polyester film, according to claim 1, wherein the polyester is polyethylene terephthalate, polyethylene-2,6-naphthalene dicarboxylate or a copolymer thereof or a modification product thereof.

10. A biaxially oriented polyester film, according to claim 1, wherein the halfwidth in the circumferential direction of the diffraction peak of the crystal face in the principle direction of the polyester, obtained when the polyester film is revolved around its normal, in the crystal orientation analysis by wide angle X-ray diffractometry, is in a range of 55 to 85 degrees.

11. A magnetic recording medium, using the biaxially oriented polyester film as set forth in any one of claims 1 through 10.

12. A method for producing a biaxially oriented polyester film characterized in that the dimensional change rate (A) in the transverse direction of the film is in a range of −0.3 to 0% when the film is allowed to stand at 49° C. and 90% RH for 72 hours, while being loaded with 32 MPa in the machine direction, wherein the method comprises stretching a cast film in the machine direction and in the transverse direction, stretching the film again in the machine direction and/or in the transverse direction, heat-set treating the film and relaxation-treating the film, characterized by executing the relaxation treatment in two or more stages at a total relaxation rate of 5 to 10%.

13. A method for producing a biaxially oriented polyester film characterized in that the dimensional change rate (A) in the transverse direction of the film is in a range of −0.3 to 0% when the film is allowed to stand at 49° C. and 90% RH for 72 hours, while being loaded with 32 MPa in the machine direction, comprising the steps of stretching a cast film in the machine direction and in the transverse direction, stretching at a small ratio of 1.01 to 1.3 times in the transverse direction at a temperature in a range of glass transition temperature (Tg) to Tg+50° C., and stretching again in the machine direction and/or in the transverse direction.

14. A method for producing a biaxially oriented polyester film characterized in that the dimensional change rate (A) in the transverse direction of the film is in a range of −0.3 to 0% when the film is allowed to stand at 49° C. and 90% RH for 72 hours, while being loaded with 32 MPa in the machine direction, wherein the method comprises stretching a cast film in the machine direction and in the transverse direction, stretching the film at a small ratio of 1.01 to 1.3 times in the transverse direction at a temperature in a range of glass transition temperature (Tg) to Tg+50° C., stretching the film again in the machine direction and/or in the transverse direction, heat-set treating the film, and relaxation-treating the cast film, characterized by executing the relaxation treatment in two or more stages at a total relaxation rate of 5 to 10%.

15. A method for producing a biaxially oriented polyester film, according to any one of claims 12 through 14, wherein when the cast film is stretched in the machine direction and in the transverse direction, it is stretched in two or more stages in the machine direction and/or in the transverse direction.

* * * * *